United States Patent
Huang et al.

(10) Patent No.: US 12,355,536 B2
(45) Date of Patent: Jul. 8, 2025

(54) PRECODING MATRIX INDICATOR FEEDBACK FOR MULTIPLE TRANSMISSION HYPOTHESES

(71) Applicant: QUALCOMM Incorporated, San Diego, CA (US)

(72) Inventors: Min Huang, Beijing (CN); Chao Wei, Beijing (CN); Hao Xu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 376 days.

(21) Appl. No.: 17/793,364

(22) PCT Filed: Jan. 23, 2020

(86) PCT No.: PCT/CN2020/073986
§ 371 (c)(1),
(2) Date: Jul. 15, 2022

(87) PCT Pub. No.: WO2021/147078
PCT Pub. Date: Jul. 29, 2021

(65) Prior Publication Data
US 2023/0058460 A1    Feb. 23, 2023

(51) Int. Cl.
*H04B 7/06*    (2006.01)

(52) U.S. Cl.
CPC ......... *H04B 7/0639* (2013.01); *H04B 7/0626* (2013.01)

(58) Field of Classification Search
CPC .. H04B 7/0626; H04B 7/0417; H04B 7/0456; H04B 7/0608; H04B 7/0639; H04B 7/0691; H04B 7/0697; H04B 7/0802; H04L 5/005; H04L 5/0057; H04W 72/046;
(Continued)

(56) References Cited

U.S. PATENT DOCUMENTS

| 8,923,143 B2 | 12/2014 | Gorokhov et al. |
| 9,698,887 B2 | 7/2017 | Geirhofer et al. |
| 11,018,745 B2 | 5/2021 | Zhang et al. |

(Continued)

FOREIGN PATENT DOCUMENTS

| WO | 2011008519 A1 | 1/2011 |
| WO | 2014138625 A1 | 9/2014 |
| WO | 2018228486 A1 | 12/2018 |

OTHER PUBLICATIONS

WO 2018229078 A1 (Year: 2018).*
(Continued)

*Primary Examiner* — Rushil P. Sampat
(74) *Attorney, Agent, or Firm* — Loza & Loza, LLP/Qualcomm

(57) ABSTRACT

Aspects relate to reporting channel state information (CSI) for a plurality of multiple transmission and reception points (TRPs) in a communication system. Downlink (DL) channels received from multiple TRPs are measured and a plurality of transmission hypotheses based on the measured DL channels from the multiple TRPs. The CSI is transmitted to a network in the communication system and includes a precoding matrix indicator (PMI) having at least a spatial domain basis matrix that is common to all of the transmission hypotheses and at least one coefficient matrix that is based on the spatial domain basis matrix.

40 Claims, 13 Drawing Sheets

(58) Field of Classification Search
CPC ........... H04W 72/082; H04W 72/1273; H04W 72/23; H04W 72/541
See application file for complete search history.

(56) References Cited

U.S. PATENT DOCUMENTS

| | | | |
|---|---|---|---|
| 11,632,208 | B2 | 4/2023 | Chen et al. |
| 2015/0030092 | A1 | 1/2015 | Krishnamurthy |
| 2018/0262253 | A1 | 9/2018 | Rahman et al. |
| 2018/0278392 | A1 | 9/2018 | Onggosanusi et al. |
| 2019/0349033 | A1 | 11/2019 | Fakoorian et al. |
| 2021/0143870 | A1* | 5/2021 | Faxér ................ H04L 5/0057 |
| 2021/0359742 | A1* | 11/2021 | Mondal ............. H04W 72/0453 |
| 2022/0094399 | A1* | 3/2022 | Gao .................... H04B 7/0417 |

OTHER PUBLICATIONS

WO 2020144602 A1 (Year: 2020).*
Huawei., et al., "CSI Measurement Enhancement for Multi-TRP/Panel Transmission", 3GPP TSG RAN WG1 Meeting #96bis, R1-1903982, Xi'an, China, Apr. 8-12, 2019, Apr. 12, 2019 (Apr. 12, 2019) The Whole Document, 6 Pages, Sections 2-4.
Huawei., et al., "CSI Measurement Enhancement for Multi-TRP/PanelTransmission", 3GPP TSG RAN WGI Meeting #97, RI-1906038, Reno, USA, May 13-17, 2019, May 17, 2019 (May 17, 2019), Sections 1-2, 4 Pages.
International Search Report and Written Opinion—PCT/CN2020/073986—ISA/EPO—Oct. 26, 2020.
Qualcomm Incorporated: "Multi-TRP Enhancements", 3GPP Draft, 3GPP TSG-RAN WG1 Meeting #97, R1-1907289, Multi-TRP Enhancements, 3rd Generation Partnership Project (3GPP), Mobile Competence Centre, 650, Route Des Lucioles, F-06921, Sophia-Antipolis Cedex, France, vol. RAN WG1, No. Reno, Nevada, USA, May 13, 2019-May 17, 2019, May 4, 2019 (May 4, 2019), XP051709312, 25 Pages, Retrieved from the Internet: URL: http://www.3gpp.org/ftp/tsg%5Fran/WG1%5FRL1/TSGR1%5F97/Docs/R1%2D1907289%2Ezip [retrieved on May 4, 2019] pp. 4-6, 3.1 POSCH and PDCCH Related Enhancements pp. 6-7, 3.1.1 UE Capability Framework for Multi-TRP pp. 7-8, 3.2.1 Joint HARQ-Ack Payload I Feedback p. 7, figure 1, sections 1-3, Introduction Agreement, p. 5, Agreement, Section 3.1.1, p. 6, Section 3.2, Section 3.2.1, p. 7.
Apple: "Remaining Issues on CSI Enhancement for MU-MIMO Support", 3GPP TSG RAN WG1 #99, R1-1912822, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019 Nov. 9, 2019, XP051823622, Reno, USA, 2019, pp. 1-7, section I.
Supplementary European Search Report—EP20916074—Search Authority—Munich—Aug. 28, 2023.

* cited by examiner

PRECODING MATRIX INDICATOR FEEDBACK FOR MULTIPLE TRANSMISSION HYPOTHESES

CROSS-REFERENCE TO RELATED APPLICATION(S)

This application is the U.S. national stage of PCT patent application number PCT/CN2020/073986 filed on Jan. 23, 2020.

TECHNICAL FIELD

The technology discussed below relates generally to wireless communication systems, and more particularly, to jointly providing precoding matrix indicator feedback for multiple transmission hypotheses in multiple transmission and reception point (multi-TRP) systems.

INTRODUCTION

In wireless communication systems, such as 5G NR systems, multiple transmission and reception point (multi-TRP) technology may be used for implementing transmissions to and from a particular g Node B (gNB) or similar base station (BS). The TRPs may be any of a number of wireless devices such as macro-cells, small cells, pico-cells, femto-cells, remote radio heads (RRHs), or relay nodes as examples. Multi-TRP technology engenders a gNB that includes dynamic coordination between multiple numbers of TRPs to provide joint scheduling and transmissions and receptions. A wireless device, such as a user equipment (UE), may be then served by multiple TRPs to improve its signal transmission/reception, which results in increased throughput, among other things.

Feedback for determining and reporting channel state information from UEs to a radio access network in such systems, such as feedback through channel state information (CSI) and precoding matrix indicators (PMIs), in particular, includes the UE measuring various radio channel state parameters and reporting the results to the network (i.e., the gNB) with the CSI feedback, which is then used to determine the precoders and/or beamforming in the gNB. Further, multi-TRP systems are a development of massive multiple-input, multiple-output (MIMO) systems wherein the number of gNB or base station (BS) antennas is increased with multiple TRPs. Since the number of feedback bits for codebooks (i.e., a set of precoders or precoding matrices) scales linearly with the number of antennas in a MIMO system, the overhead on the uplink from UE to gNB is increased due to the greater amount of feedback information.

Accordingly, as the demand for mobile broadband access continues to increase, research and development continues to advance wireless communication technologies, including reducing CSI (e.g., PMI) overhead to improve and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to a first aspect, a method for a user equipment (UE) to report channel state information (CSI) for a plurality of transmission and reception points (TRPs) in a communication system is disclosed. The method includes measuring downlink (DL) channels received from a plurality of TRPs, and determining a plurality of transmission hypotheses based on the measured DL channels from the plurality of TRPs. Furthermore, the method includes transmitting channel state information (CSI) to a network in the communication system, the CSI including a precoding matrix indicator (PMI) having at least a spatial domain basis matrix that is common to all of the plurality of transmission hypotheses and at least one coefficient matrix that is based on the spatial domain basis matrix.

In another aspect, an apparatus for wireless communication is disclosed. The apparatus includes means for measuring downlink (DL) channels received in a user equipment (UE) from a plurality of transmission and reception points (TRPs) in a communication system, and means for determining a plurality of transmission hypotheses based on the measured DL channels from the plurality of TRPs. Also, the apparatus includes means for transmitting channel state information (CSI) to a network in the communication system, the CSI including a precoding matrix indicator (PMI) having at least a spatial domain basis matrix that is common to all of the plurality of transmission hypotheses and at least one coefficient matrix that is based on the spatial domain basis matrix.

According to yet another aspect, a non-transitory computer-readable medium storing computer-executable code is disclosed. The code includes code for causing a computer to measure downlink (DL) channels received in a user equipment (UE) from a plurality of transmission and reception points (TRPs) in a communication system, and determine a plurality of transmission hypotheses based on the measured DL channels from the plurality of TRPs. The code also includes code for causing a computer to transmit channel state information (CSI) to a network in the communication system, the CSI including a precoding matrix indicator (PMI) having at least a spatial domain basis matrix that is common to all of the plurality of transmission hypotheses and at least one coefficient matrix that is based on the spatial domain basis matrix.

In yet another aspect, an apparatus for wireless communication is disclosed that includes at least one processor, a transceiver communicatively coupled to the at least one processor, and a memory communicatively coupled to the at least one processor. The at least one processor is further configured to measure downlink (DL) channels received from a plurality of transmission and reception points (TRPs) in a communication system, and determine a plurality of transmission hypotheses based on the measured DL channels from the plurality of TRPs. Moreover, the at least one processor is configured to transmit channel state information (CSI) to a network in the communication system, the CSI including a precoding matrix indicator (PMI) having at least a spatial domain basis matrix that is common to all of the plurality of transmission hypotheses and at least one coefficient matrix that is based on the spatial domain basis matrix.

In yet another aspect, a method for a base station to configure channel state information (CSI) reporting in a multiple transmission and reception point (TRP) communication system is disclosed. The method includes configuring a UE to determine a plurality of transmission hypotheses based on the measured downlink (DL) channels from a plurality of TRPs. Additionally, the method includes receiving CSI from the UE, the CSI including a precoding matrix indicator (PMI) having at least a spatial domain basis matrix that is common to all of the plurality of transmission hypotheses and at least one coefficient matrix that is based on the spatial domain matrix.

According to another aspect, an apparatus for wireless communication is disclosed including means for configuring a user equipment (UE) to determine a plurality of transmission hypotheses based on measured downlink (DL) channels from a plurality of TRPs. Additionally, the apparatus includes means for receiving channel state information (CSI) from the UE, the CSI including a precoding matrix indicator (PMI) having at least a spatial domain basis matrix that is common to all of the plurality of transmission hypotheses and at least one coefficient matrix that is based on the spatial domain basis matrix.

In still another aspect, a non-transitory computer-readable medium storing computer-executable code is disclosed. The code includes code for causing a computer to configure a user equipment (UE) to determine a plurality of transmission hypotheses based on measured downlink (DL) channels from a plurality of TRPs. The code further includes code for causing a computer to receive channel state information (CSI) from the UE, the CSI including a precoding matrix indicator (PMI) having at least a spatial domain basis matrix that is common to all of the plurality of transmission hypotheses and at least one coefficient matrix that is based on the spatial domain basis matrix.

According to yet one final aspect, an apparatus for wireless communication is disclosed including at least one processor, a transceiver communicatively coupled to the at least one processor, and a memory communicatively coupled to the at least one processor. The at least one processor is further configured to configure a user equipment (UE) to determine a plurality of transmission hypotheses based on measured downlink (DL) channels from a plurality of TRPs. Further, the at least one processor is also configured to receive channel state information (CSI) from the UE, the CSI including a precoding matrix indicator (PMI) having at least a spatial domain basis matrix that is common to all of the plurality of transmission hypotheses and at least one coefficient matrix that is based on the spatial domain basis matrix.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
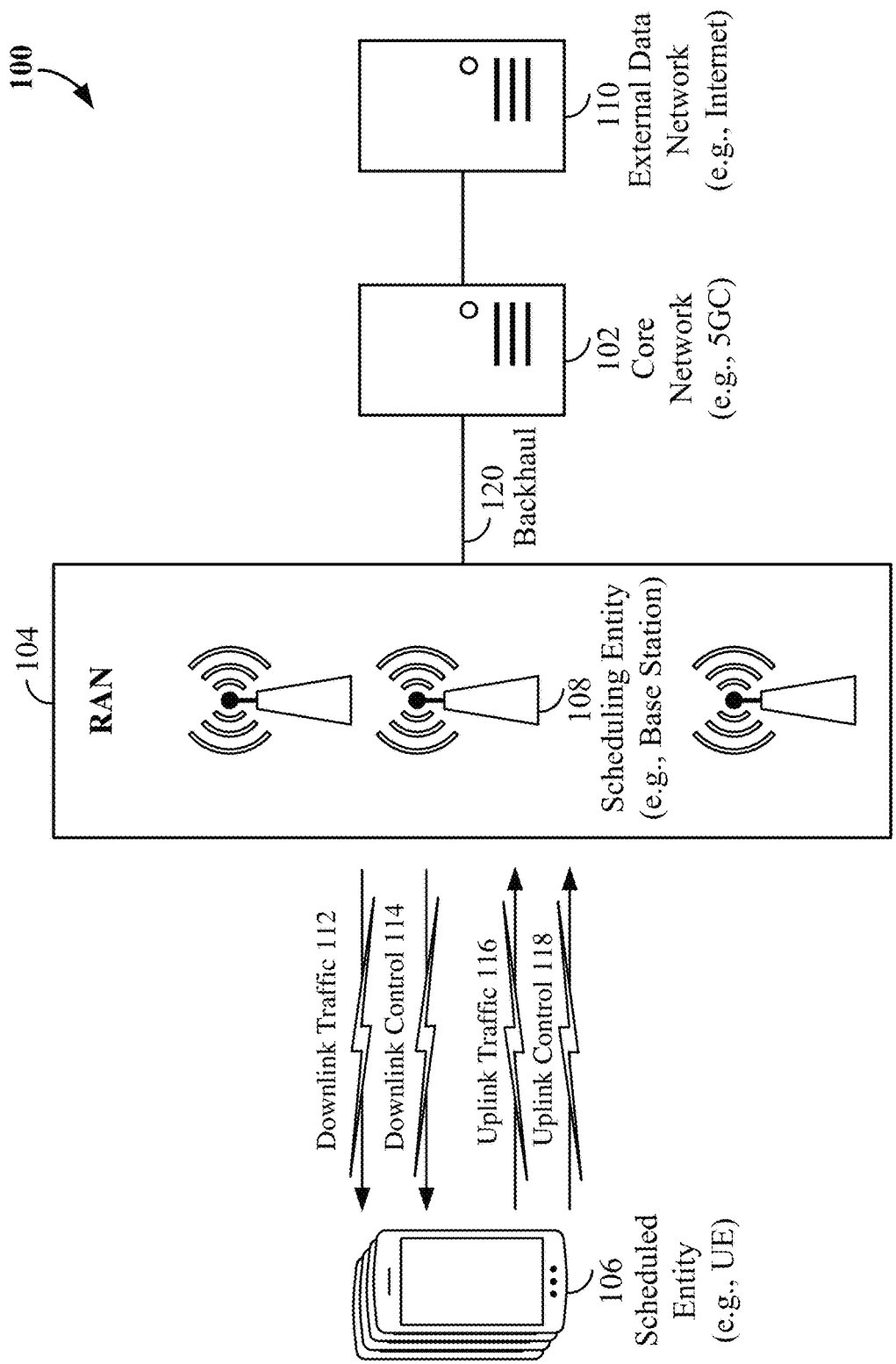
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

As discussed above, CSI feedback, particularly when used in multiple-TRP systems and/or massive MIMO schemes, can cause the CSI overhead to increase. Accordingly, the present disclosure provides a CSI feedback scheme to report PMI for multiple transmission hypotheses jointly or combined. It is noted here that a transmission hypothesis for a UE includes transmitting a signal from a certain one or more TRPs to the UE. This scheme provides improved efficiency for a wireless network as compared with schemes that separately report the PMI for each multi-TRP transmission hypothesis. Joint or combined PMI reporting of multiple multi-TRP transmission hypothesis may significantly reduce the PMI feedback payload thereby improving spectrum efficiency and enhancing coverage for the wireless network.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-topoint transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
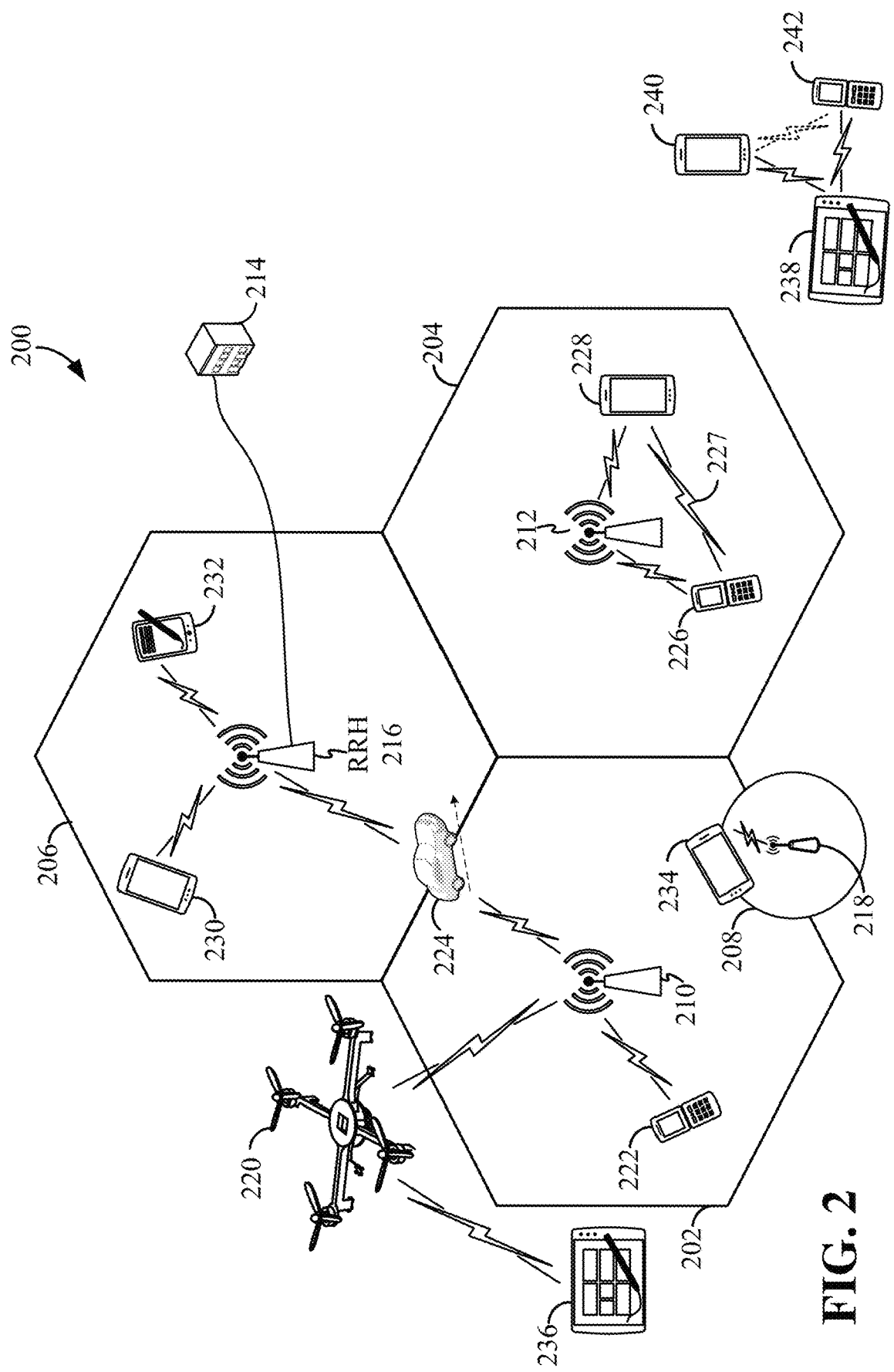
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

Figure 3:
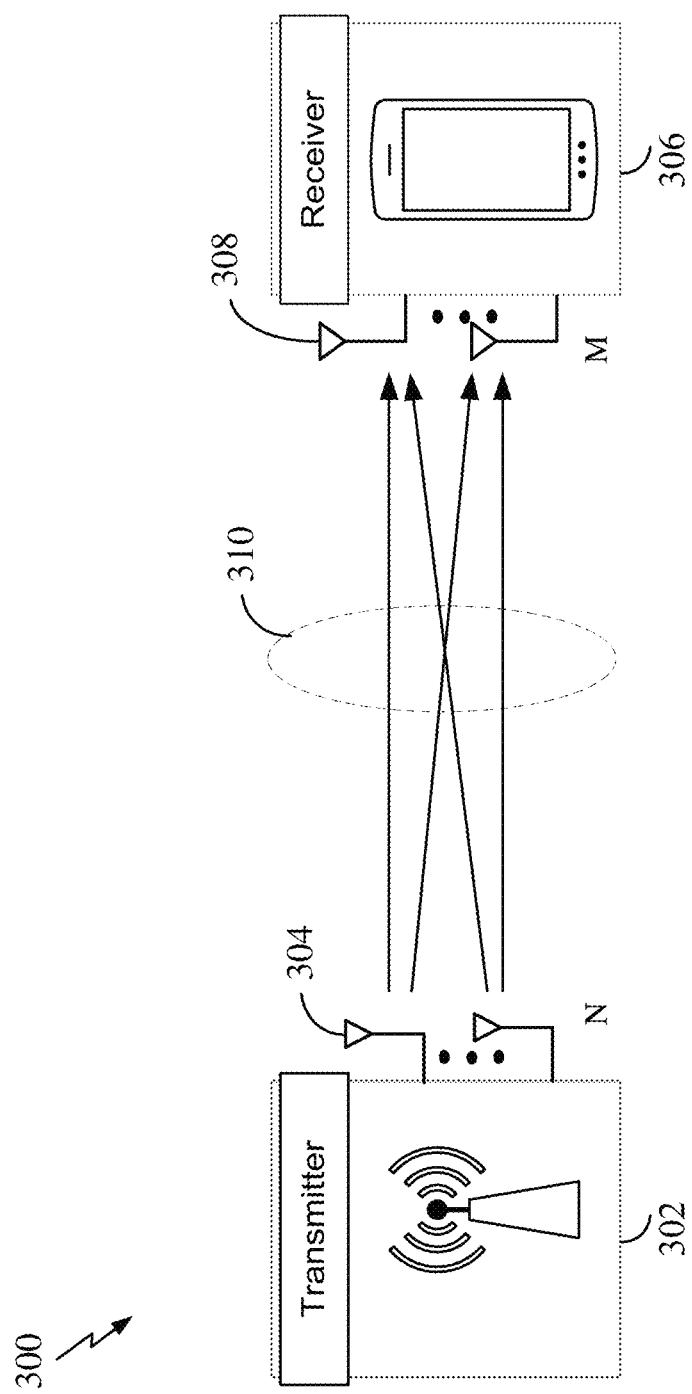
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 4:
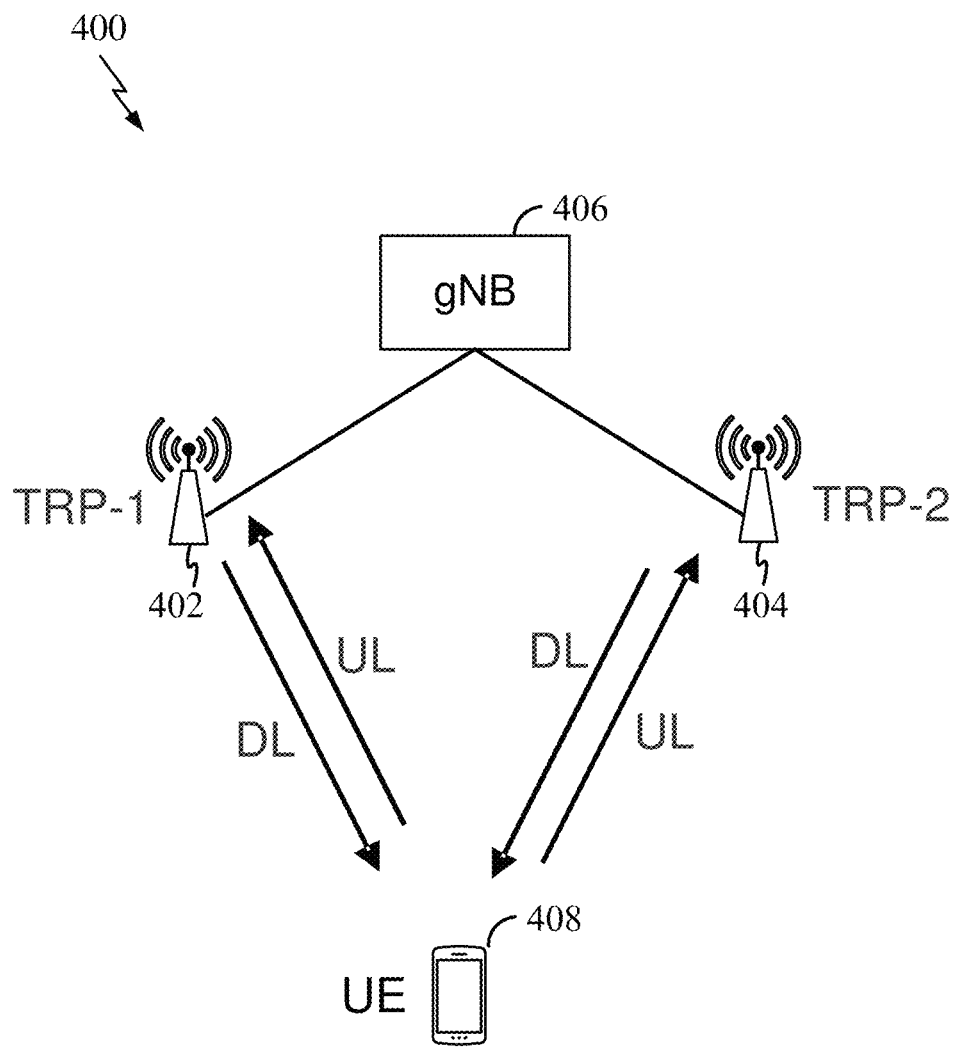
FIG. 4 illustrates is a schematic illustration of a wireless communication system utilizing multiple transmission and reception points according to some aspects.

FIG. 4 illustrates, by way of example and without limitation, a schematic illustration of a portion 400 of a RAN utilizing multi-TRPs. In this example, two exemplary transmission and reception points (TRP-1 and TRP-2) are shown at 402 and 404, but application of the presently disclosed CSI reporting schemes is not limited to this specific number of TRPs. In this example, the two TRPs 402, 404 are used to effectuate communications for a single gNB 406, which is shown communicatively coupled to the TRPs 402, 404. In particular, the gNB 406 can transmit from different TRPs (e.g., TRPs 402 or 404) to a UE 408 on multiple DL channels (e.g., physical downlink shared channel (PDSCH) links), which enhances diversity gain, DL system capacity, and/or DL cell coverage. In turn, the UE 408 may measure and/or determine channel state information (CSI) that is transmitted on UL channels (e.g., a physical uplink control channel (PUCCH)) to one or more of the TRPs 402, 404 to the network (e.g., the gNB 406). As will be discussed in more detail later, the present disclosure provides for a CSI scheme that jointly reports multiple CSI or PMI hypotheses from a UE (e.g., UE 408) to the network or gNB (e.g., gNB 406).

With reference back to the system of FIG. 3, it is noted that the transmitter 302, within the context of a multi-TRP system such as that illustrated in FIG. 4, may constitute a gNB and that multiple TRPs may be used to implement the gNB. Furthermore, each TRP (e.g., 402, 404) may respectively employ MIMO technology where each TRP transmits using multiple antennas. Still further, each TRP 402, 404 may employ a same precoding that is determined based on the CSI feedback from the UE for each of the multiple TRPs, but are not necessarily limited to such.

It is noted here that precoding, also known as transmit beamforming, involves the canceling of multiuser interference by multiplying transmit signals for DL transmissions by precoding matrixes or vectors. The derivation of these precoding matrixes is based on the CSI information including PMI that is received from one or more UEs, and which will be explained in more detail later. Precoding is an interference pre-cancelation technique that exploits the spatial degrees of freedom offered by the multiple transmit antennas to simultaneously serve UEs with one or more antennas.

The transmissions of CSI and PMI reporting disclosed herein may each be transmitted over radio access technologies using carriers that may be organized into frames, subframes, and slots. Various aspects of the present disclosure will be described with reference to an OFDM waveform, schematically illustrated in FIG. 5. Within the present disclosure, a frame refers to a duration of 10 ms for wireless transmissions, with each frame consisting of 10 subframes of 1 ms each. On a given carrier, there may be one set of frames in the UL, and another set of frames in the DL.

Figure 5:
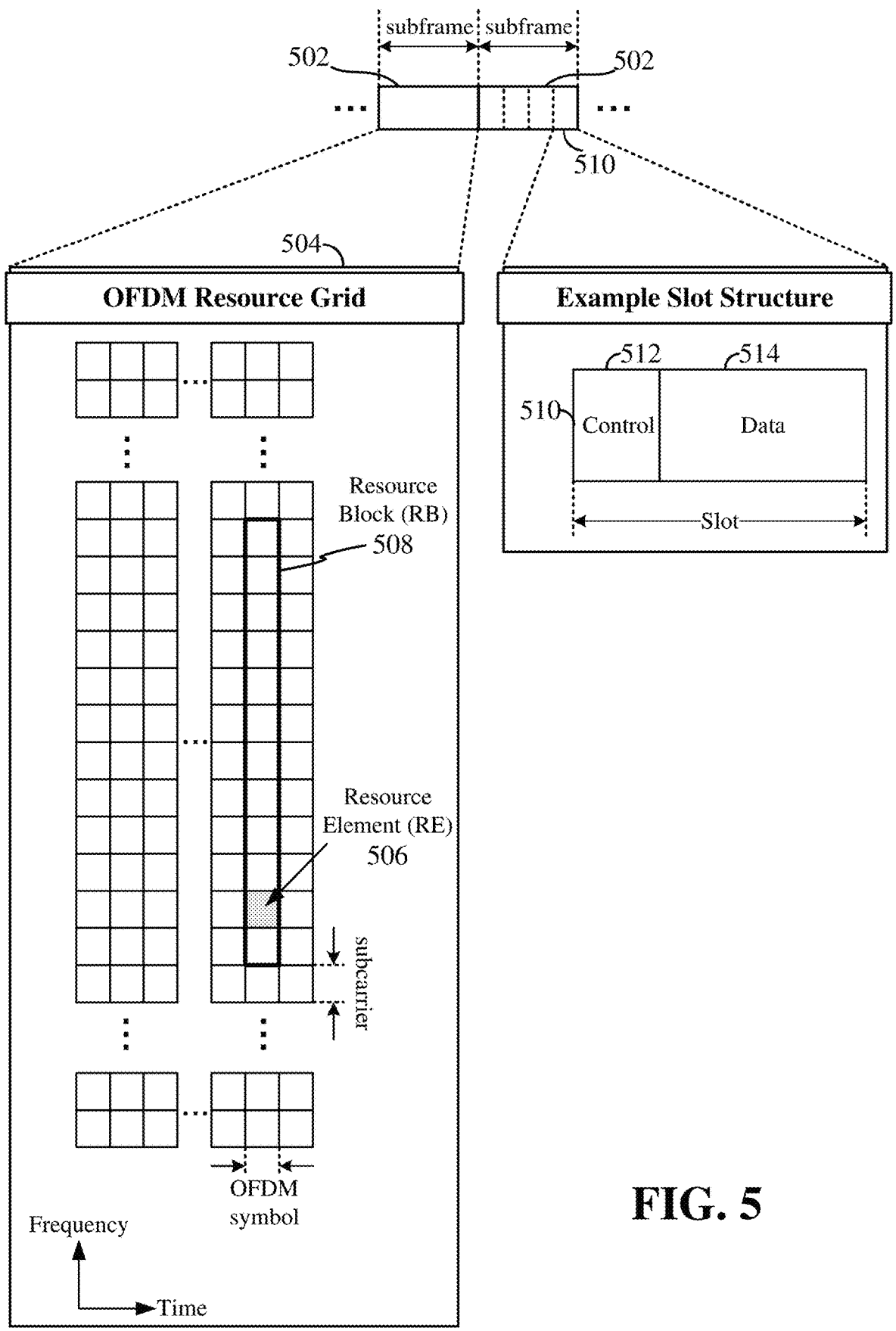
FIG. 5 is a schematic illustration of an organization of wireless resources in an air interface utilizing orthogonal frequency divisional multiplexing (OFDM) according to some embodiments.

Referring now to FIG. 5, an expanded view of an exemplary DL subframe 502 is illustrated, showing an OFDM resource grid 504. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 504 may be used to schematically represent time-frequency resources for a given antenna port. That is, in a MIMO implementation with multiple antenna ports available, a corresponding multiple number of resource grids 404 may be available for communication. The resource grid 504 is divided into multiple resource elements (REs) 506. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 508, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 508 entirely corresponds to a single direction of communication (either transmission or reception for a given device).

A UE generally utilizes only a subset of the resource grid 504. An RB may be the smallest unit of resources that can be allocated to a UE. Thus, the more RBs scheduled for a UE, and the higher the modulation scheme chosen for the air interface, the higher the data rate for the UE.

In this illustration, the RB 508 is shown as occupying less than the entire bandwidth of the subframe 502, with some subcarriers illustrated above and below the RB 508. In a given implementation, the subframe 502 may have a bandwidth corresponding to any number of one or more RBs 508. Further, in this illustration, the RB 508 is shown as occupying less than the entire duration of the subframe 502, although this is merely one possible example.

Each subframe 502 (e.g., a 1 ms subframe) may consist of one or multiple adjacent slots. In the example shown in FIG. 5, one subframe 502 includes four slots 510, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 510 illustrates the slot 510 including a control region 512 and a data region 514. In general, the control region 512 may carry control channels (e.g., PDCCH), and the data region 514 may carry data channels (e.g., PDSCH or PUSCH). Of course, a slot may contain all DL, all UL, or at least one DL portion and at least one UL portion. The simple structure illustrated in FIG. 5 is merely exemplary in nature, and different slot structures may be utilized, and may include one or more of each of the control region(s) and data region(s).

Although not illustrated in FIG. 5, the various REs 506 within an RB 508 may be scheduled to carry one or more physical channels, including control channels, shared channels, data channels, etc. Other REs 506 within the RB 508 may also carry pilots or reference signals. These pilots or reference signals may provide for a receiving device to perform channel estimation of the corresponding channel, which may enable coherent demodulation/detection of the control and/or data channels within the RB 508.

In a DL transmission, the transmitting device (e.g., the scheduling entity 108) may allocate one or more REs 506 (e.g., within a control region 512) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 506 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 506 (e.g., within the data region 514) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 5 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

According to various 3GPP new radio specifications, including Releases 15 and 16, various codebooks (or precoding matrices or precoders) include two types (e.g., Type 1 and Type 2) that have been specified for the channel state information (CSI) feedback in the support of advanced MIMO operation. Both types of codebook are constructed from 2-D discrete Fourier transform (DFT) based grid of beams, and enable the CSI feedback for beam selection as well as PSK based co-phase combining between two polarizations. One type of codebook includes what is known as a "Type II" or "Type-2" codebook. Type-2 codebook based CSI feedback enables more explicit channel feedback than a Type-1 based CSI feedback in that both beam direction and amplitude are reported by the UE in the CSI feedback. Type-2 codebook based CSI feedback reports the wideband and subband amplitude information of the selected beams. As a result, a more accurate CSI may be obtained from the Type-2 codebook based CSI feedback so that better precoded DL MIMO transmissions can be employed by the network and a channel can be characterized with more accurate spatial and amplitude information. In one particular example, the Type-2 codebook was specified without frequency compression for CSI feedback. An example of this type of Type-2 codebook without frequency compression is illustrated in FIG. 6.

Figure 6:
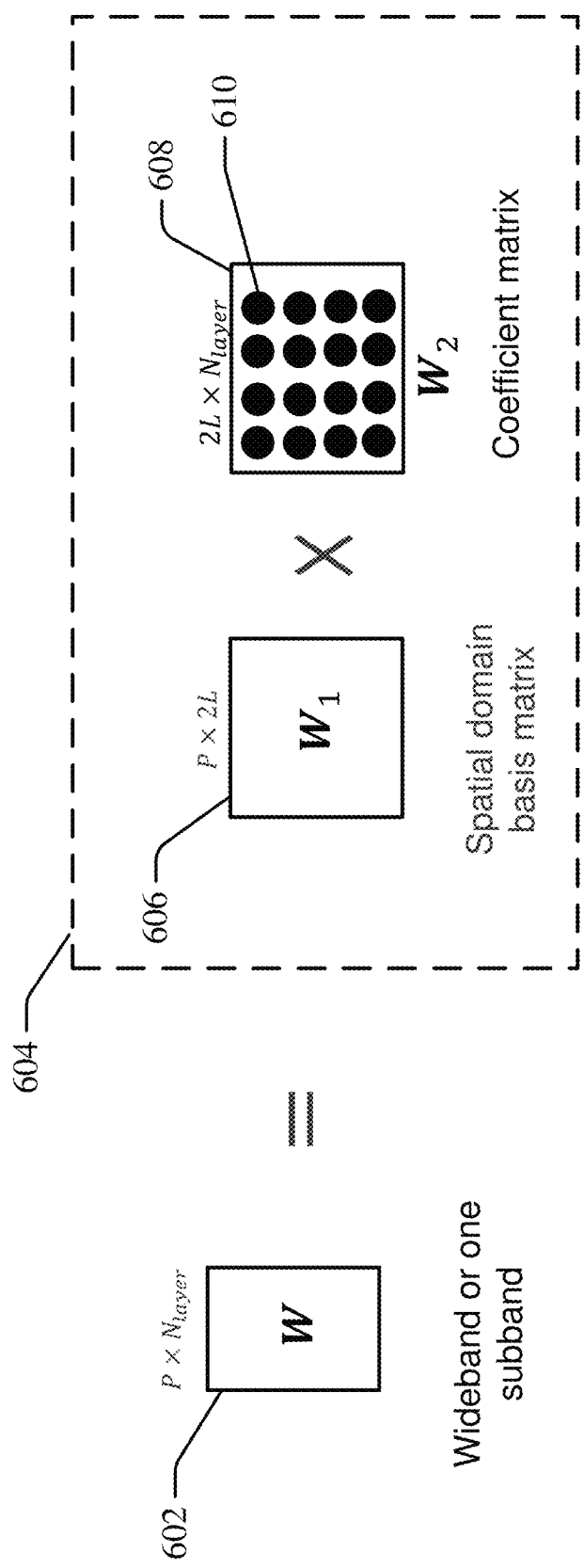
FIG. 6 is an illustration of the composition of an exemplary precoding matrix.

As shown in FIG. 6, a precoding matrix or vector (which is interchangeable with "precoder") W 602 for the wideband or a frequency subband is determined by a matrix product of CSI feedback information received from a UE and shown generally at box 604. The CSI feedback information in box 604 consists of a spatial domain basis matrix $W_1$ 606 and a coefficient matrix $W_2$ 608. In particular, the spatial domain basis matrix $W_1$ 606 is a P×2L matrix consisting of an L number of beams (i.e., L columns) per polarization group. In this exemplary case, since there are two polarization groups, there are a total of 2L beams. The value P is equal to $2N_1N_2$ where $N_1$ and $N_2$ are the numbers of horizontal and vertical antenna elements, respectively.

Matrix 608 is a $2L \times N_{layer}$ coefficient matrix containing coefficients for each beam's contribution in each layer. In matrix 608, one column represents one layer, and one element 610 therein represents one beam within this layer. The value $N_{layer}$ represents the number of spatial layers, which corresponds to the number of columns in matrix 608.

Since the spatial domain basis matrix 606 is a P×2L matrix and the coefficient matrix 608 is $2L \times N_{layer}$ matrix, the product or quantization of these matrices yields a precoding matrix 602 having a size of $P \times N_{layer}$. When the precoding matrix 602 is wideband, the component matrixes $W_1$ 606 and $W_2$ 608 are both wideband. On the other hand, when the precoding matrix 602 is subband, the spatial domain basis matrix $W_1$ 606 is still wideband, but the coefficient matrix $W_2$ 608 is subband. A UE reports (or issues a report of) the quantization results of $W_1$ 606 and $W_2$ 608 as PMI in the CSI over UL channels to the network (e.g., the gNB). In turn, the network or gNB uses the quantization results to determine the precoder matrix W based on the product of $W_1$ 606 and coefficient matrix W 608 as is illustrated in FIG. 6.

Other Type 2 codebooks include frequency compression to further reduce the CSI overhead. An example of this type of Type-2 codebook with frequency compression is illustrated in FIG. 7, where for one layer the precoding matrix is determined by exploiting the sparsity of both the spatial and frequency domains.

Figure 7:
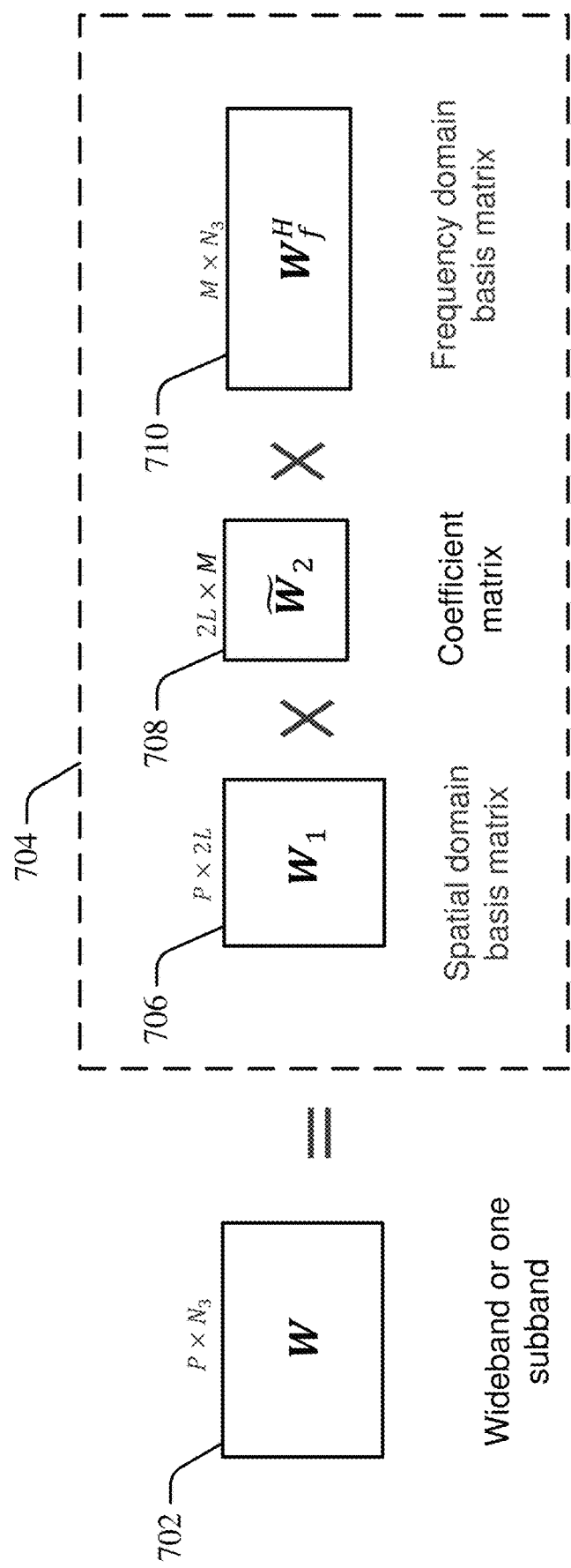
FIG. 7 is an illustration of the composition of an exemplary precoding matrix with frequency compression.

As shown in FIG. 7, a precoding matrix or vector W 702 for a spatial layer is determined by a matrix product of CSI feedback information shown generally at box 704. Box 704 includes a spatial domain basis matrix $W_1$ 706, a coefficient matrix $\tilde{W}_2$ 708, and a frequency domain basis matrix $W_f^H$ 710. In particular, the spatial domain basis matrix $W_1$ 606 is a P×2L matrix consisting of an L number of beams (i.e., L columns) per polarization group. As there are two polarization groups, there are a total of 2L beams. The value P is equal to $2N_1N_2$ where $N_1$ and $N_2$ are the numbers of horizontal and vertical antenna elements, respectively.

The coefficient matrix $\tilde{W}_2$ 708 consists of linear combination coefficients including amplitude and phase, where each element represents the coefficient of a tap for a beam. This matrix 708 is a 2L×M matrix, wherein M is the number of frequency-domain compression basis vectors. The frequency domain basis matrix $W_f^H$ 710 is a M×N3 matrix consisting of an $N_3$ number of subbands where each row is a basis vector. The matrix 710 is used to perform compression in the frequency domain. For example, the basis vectors in frequency domain basis matrix $W_f^H$ 710 are derived from a certain number of columns in a DFT matrix. A UE then reports (or issues a report of) the quantization results of $W_1$ 706, coefficient matrix $\tilde{W}_2$ 708, and frequency domain basis matrix $W_f^H$ 710 as PMI in the CSI over UL channels to the gNB. In turn, the network or gNB uses the quantization results to determine the precoder matrix W based on the product of $W_1$ 706, coefficient matrix $W_2$ 708, and frequency domain basis matrix $W_f^H$ 710, as is illustrated in FIG. 7.

When the CSI feedback schemes discussed in FIGS. 6 and 7 are utilized in a multi-TRP scenario, the amount of CSI overhead significantly increases. In particular, in order to optimize TRP selection and precoding determination, a UE needs to provide CSI feedback for various transmission hypotheses. Knowing the CSI for multiple transmission hypotheses is beneficial for a gNB to be able to decide a proper DL transmission mode that optimally addresses all aspects of the network (e.g., spectrum efficiency, energy efficiency, fairness, service QoS, etc.).

Of further note here, a transmission hypothesis contains a set of signal TRPs and a set of interference TRPs. Since the constructions of signal TRPs or interference TRPs are various, the number of possible transmission hypotheses increases significantly with the number of TRPs. For example, when a gNB connects TRP-1 and TRP-2 (e.g., 402 and 404 in FIG. 4), then the possible transmission hypotheses include: 1) transmitting a signal from TRP-1 without interference; 2) transmitting a signal from TRP-2 without interference; 3) transmitting signals from TRP-1 and TRP-2; 4) transmitting a signal from TRP-1 with interference from TRP-2; and/or 5) transmitting s signal from TRP-2 with interference from TRP-1. In this case, if UE follows reports CSI separately for each of these transmission hypotheses, the CSI payload may increase greatly. Such an increase makes it quite difficult for a UE to feed back such a large amount of CSI via the UL channels. Yet further, it is noted that typically the largest portion within a CSI report is PMI, especially if a Type-2 codebook PMI is applied. Thus, in order to reduce the CSI payload, an effective way reduce the CSI payload is to reduce the constituent PMI payload. Accordingly, aspects of the present disclosure seek to provide schemes that reduce the PMI feedback amount, particularly in cases where a UE is required to feed back CSI that covers multiple multi-TRP hypotheses.

In an aspect, the present disclosure provides schemes where a UE may be configured (such as through RRC messaging from the gNB) to jointly report a Type-2 codebook based PMI for a plurality of transmission hypotheses. In this scheme, a UE is configured to measure the channels for all concerned TRPs in the multi-TRP system. The UE then reports the PMI within the CSI to the network (i.e., a gNB). The reporting may be based on the whether the Type-2 codebook is without frequency compression (e.g., the example of FIG. 6) or with frequency compression (e.g., the example of FIG. 7) as will be discussed in more detail below.

Figure 8:
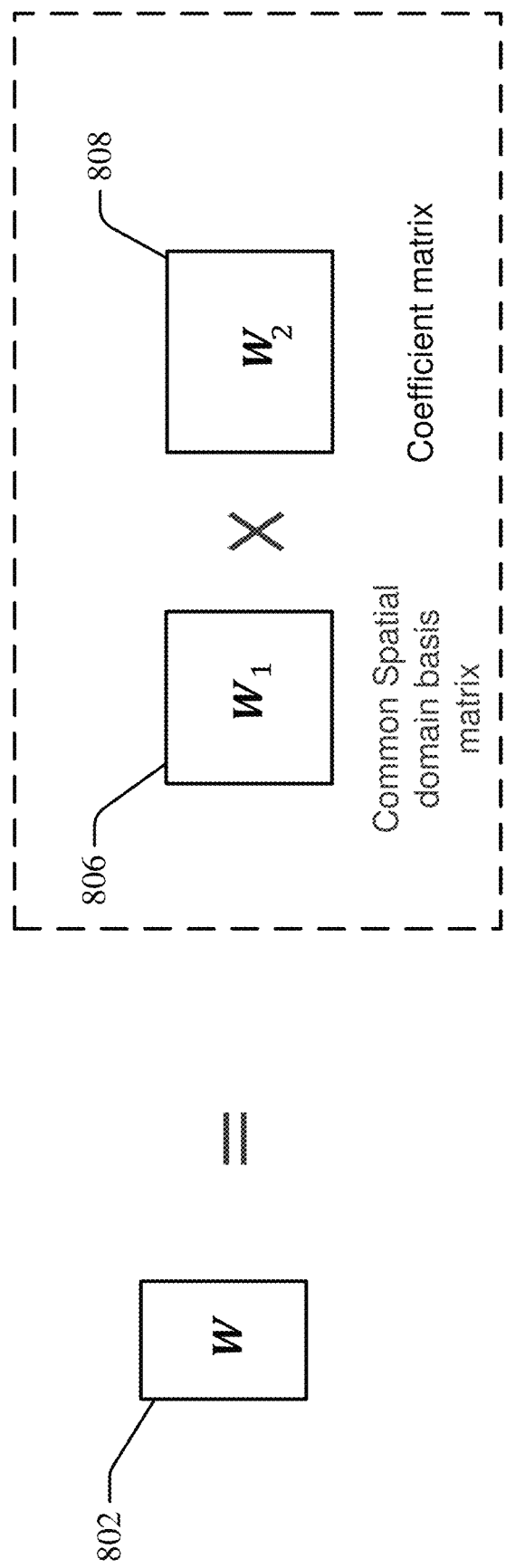
FIG. 8 is an illustration of the composition of an exemplary precoding matrix according to some aspects of the disclosure.

In particular, for a type II codebook without frequency compression, such as was discussed in connection with FIG. 6, the UE may be configured to first report a spatial domain basis matrix that is shared by or common to all transmission hypotheses of the plurality of transmission hypotheses. The UE then reports a wideband or a list of per-subband coefficient matrixes respectively for each transmission hypothesis, wherein the product of the spatial domain basis matrix and the coefficient matrix constitutes a DL precoding matrix. As an example, FIG. 8 illustrates that the DL precoding matrix 802 W may be the product of a common spatial domain basis matrix that is common for all transmission hypotheses $W_1$ 806 and also a coefficient matrix $W_2$ 808. The coefficient matrix 808 may be a wideband coefficient matrix or a list of subband coefficient matrixes, for each referred transmission hypothesis.

In an aspect, it is noted that in a CSI report configuration determined by network (e.g., a gNB), the UE may be configured to report the PMI for a plurality of transmission hypotheses, based on identical spatial domain basis matrix and respective coefficient matrixes of the Type-2 codebook without frequency compression. For these transmission hypotheses, in an aspect all of the concerned TRPs may be divided into two sets: (1) a signal TRP set in which each TRP acts as a signal TRP at least in one transmission hypothesis (the size is denoted as $N_{TRP}$), and (2) an interference TRP set in which each TRP does not act as a signal TRP in any transmission hypothesis.

Based on the above CSI report configuration, a UE is configured to measure radio channels of the concerned TRPs. In a first portion of the PMI (i.e., PMI Part 1 that includes the spatial domain basis matrixes), the UE then is configured to calculate and report a common, joint, or shared spatial domain basis matrix that optimally matches with the coefficient matrixes of all transmission hypotheses. In an aspect, the common spatial domain basis matrix is composed of a list of matrixes corresponding to all signal TRPs included in the CSI report configuration. For example, the spatial domain basis matrix $W_1 = \{W_1^{(TRP\ 1)}, \ldots, W_1^{(TRP\ N_{TRP})}\}$. Moreover, the UE may be configured to report the quantization of spatial domain basis matrix $W_1$. In particular, a UE can report the quantization of the matrixes $W_1^{(TRP\ 1)}$ through $W_1^{(TRP\ N_{TRP})}$.

Moreover, according to other aspects it is noted that in order to limit the size of CSI payload, the network (e.g., gNB) may be configured to regulate some of the parameters that are used for CSI reporting by the UE. In one example, a gNB may configure a parameter L_individual, which means that the number of columns in a spatial domain basis matrix (which is also equivalent to the number of spatial domain beams) of each spatial domain basis matrix $W_1^{(TRP\ n)}$ is equal to the L_individual, where n is constrained by the range $1 \leq n \leq N_{TRP}$.

In another example, the gNB may configure a parameter L_all where the sum of the number of columns (equivalent to the number of spatial domain beams) of each spatial domain basis matrix $W_1^{(TRP\ n)}$ is set equal to the value L_all. In still another example of parameter regulation, a gNB may configure a parameter L_(max,individual), which means that the number of columns (equivalent to the number of spatial domain beams) of each spatial domain basis matrix $W_1^{(TRP\ n)}$ should be not larger than this value L_(max, individual). In still another example, a gNB may configure a parameter L_(max,all), where the sum of the number of columns (equivalent to the number of spatial domain beams) of each spatial domain basis matrix $W_1^{(TRP\ n)}$ should not be larger than L_(max,all).

As mentioned above, a UE may be configured to calculate a spatial domain basis matrix $W_1$ that optimally matches with the coefficient matrixes of all transmission hypotheses. In one exemplary option, this calculation may be performed by individually calculating the matrixes $W_1^{(TRP\ 1)}$ through $W_1^{(TRP\ N_{TRP})}$ that respectively matches with a channel response matrix of each TRP in the signal TRP set assuming there is no co-transmission from other TRPs. In a second alternative option, the calculation may be performed for each transmission hypothesis by first calculating a list of matrixes that best match the respective transmission hypothesis. For example, for a Transmission Hypothesis 1, the calculation includes the transmitting signals from TRP1 and TRP2, and then calculating a $W_1^{(TRP\ 1)(hypothesis1)}$ and a $W_1^{(TRP2)(hypothesis\ 1)}$ that best matches the transmission hypothesis. After calculating the list of matrixes, the calculation then further includes integrating the resultant matrixes of all transmission hypotheses for each TRP (i.e., combining the different columns). For example, assuming an M number of hypotheses, the integration would be the column combination as represented by a spatial domain basis matrix $W_1^{(TRP\ 1)} = W_1^{(TRP\ 1)(hypothesis\ 1)} \cup W_1^{(TRP\ 1)(hypothesis\ 2)} \cup \ldots \cup W_1^{(TRP\ 1)(hypothesis\ M)})$. It will be appreciated that the first calculation option 1 has lower complexity, but that the second, alternate option will yield better performance.

For another portion of the PMI (i.e., PMI Part 2 that includes the coefficient matrixes), the UE may be configured to calculate and report a coefficient matrix $W_2$ for each TRP and each transmission hypothesis, where the calculation is based on the calculated common spatial domain basis matrix. Based on the particular CSI report configuration, the UE will report either a wideband coefficient matrix or a list of subband coefficient matrixes for each referred transmission hypothesis that is configured in the CSI report configuration. As an example, a UE may report a wideband coefficient matrix $W_2^{(TRP\ 1)(hypothesis1)}$ or a list of subband matrixes $W_2^{(TRP\ 1)(hypothesis1)(subband\ i)}$, where i is in the range of $1 \leq i \leq N_{subband}$ for TRP 1 and transmission hypothesis 1. This resultant matrix may be then quantized so that the CSI payload is reduced.

In some other aspects, in order to reduce the CSI payload, the coefficient matrixes of two transmission hypotheses for one TRP that have some relationship, shared characteristics, or commonalities may be reduced to reporting only one matrix in the payload. For example, given a scenario where coefficient matrix $W_2^{(TRP\ 1)(hypothesis\ 1)}$ = coefficient matrix $W_2^{(TRP\ 1)(hypothesis\ 2)}$ then only one of these matrixes need be reported in the CSI payload. In another example, columns from one coefficient matrix can be used to construct another coefficient matrix such as a $W_2^{(TRP\ 1)(hypothesis\ 2)}$ being composed of one or more columns of coefficient matrix $W_2^{(TRP\ 1)(hypothesis\ 1)}$. Of further note, in the instances where this reduction of CSI is employed, it is noted that since the gNB configures the CSI reporting, the gNB will recognize that the reception of only one coefficient matrix means that the coefficient matrix $W_2^{(TRP\ 1)(hypothesis\ 1)}$=coefficient matrix $W_2^{(TRP\ 1)(hypothesis\ 2)}$, as one example.

In further aspects, for a Type-2 codebook with frequency compression, such as was discussed in connection with FIG. 7, the CSI reporting scheme may include reporting, during Part 1 of the PMI, a spatial domain basis matrix that is shared by or are common to all transmission hypotheses similar to the methods discussed above. Additionally, in a codebook with frequency compression, the Part 1 reporting also includes reporting a frequency domain matrix that is shared by or is common to all transmission hypotheses. Additionally, the UE may be configured to report a list of per-layer coefficient matrixes for each transmission hypothesis, respectively, where the product of the spatial domain basis matrix, the coefficient matrixes, and the frequency domain basis matrix constitutes a DL precoding matrix W As an example, FIG. 8 illustrates that the DL precoding matrix 902 W may be the product of a common spatial domain basis matrix $W_1$ that is common for all TRP hypotheses 906, a coefficient matrix $\tilde{W}_2$ 908, and a common frequency domain basis matrix $W_f$ 910. The coefficient matrix 908 may be for each TRP and each transmission hypothesis.

According to aspects, for another CSI report configuration, a gNB may configure a UE to report PMI for a plurality of multi-TRP transmission hypotheses, based on an identical spatial domain basis matrix (i.e., a matrix with shared or common spatial domain characteristics across the plurality of hypotheses), an identical frequency domain basis matrix (i.e., a matrix with shared or common frequency domain characteristics across the plurality of hypotheses), and respective coefficient matrixes of Type-2 codebook with frequency compression.

Based on above CSI report configuration, a UE may be configured to measure radio channels of the concerned TRPs, and then, for PMI Part 1, calculate and report a common spatial domain basis matrix that optimally matches with the coefficient matrixes of all of the plurality of transmission hypotheses. In some examples, the common spatial domain basis matrix $W_1$ and the common frequency domain basis matrix $W_f$ may be composed of a list of matrixes corresponding to all signal TRPs included in the CSI report configuration. For example, $W_1 = \{W_1^{(1)}, \ldots, W_1^{(N_{TRP})}\}$, and $W_f = \{W_f^{(1)}, \ldots, W_f^{(N_{TRP})}\}$. The UE may be configured to then report the quantization of $W_1$ and $W_f$. In particular, the UE can report the quantization of $W_1^{(1)}, \ldots, W_1^{(N_{TRP})}, W_f^{(1)}, \ldots, W_f^{(N_{TRP})}$, respectively.

In some aspects, in order to limit the size of the CSI payload, a network (e.g., a gNB) may regulate some of the parameters for CSI reporting. The regulated parameters for the common spatial domain basis matrix $W_1$ that were discussed previously for a Type-2 codebook without frequency compression are equally applicable to a Type-2 codebook with frequency regulation. Additionally, other parameters for the frequency domain basis matrix $W_f$ may be regulated according a number of various schemes. In one example, a network (e.g., gNB) may configure a parameter $L'_{individual}$, which means that the number of columns (which are equivalent to the number of frequency-domain beams) of each frequency domain basis matrix $W_f^{(TRP\ n)}$ is equal to the $L'_{individual}$ parameter where n is in the range of $1 \leq n \leq N_{TRP}$.

In another example, the network (e.g., a gNB) may configure a parameter $L'_{all}$, which means that the sum of the number of columns (which is equivalent to the number of frequency-domain beams) of each frequency-domain basis matrix $W_f^{(TRP\ n)}$ is equal to $L_{all}$. In yet another example, the network (e.g., a gNB) may configure a parameter $L'_{max,individual}$, which means that the number of columns (equivalent to the number of frequency-domain beams) of each frequency-domain basis matrix $W_f^{(TRP\ n)}$ should be not larger than $L'_{max,individual}$. In still another example, the network (e.g., gNB) may configure a parameter $L'_{max,all}$, which means that the sum of the number of columns (equivalent to the number of frequency-domain beams) of each frequency-domain basis matrix $W_f^{(TRP\ n)}$ should be not be set larger than $L'_{max,all}$.

The methodology for calculating the spatial domain basis matrix $W_1$ and the frequency domain basis matrix $W_f$ to optimally match with the coefficient matrixes for all transmission hypotheses can be performed in a manner similar to the instance of a Type-2 codebook without frequency compression as discussed earlier. In particular, this calculation may include calculating the spatial domain or frequency domain basis matrix for each TRP based on its channel response matrix assuming there is no co-transmission. In another alternative, this calculation may include calculating the spatial domain or frequency domain basis matrix for each TRP and each transmission hypothesis, and then integrating (e.g., combining) the sub-matrixes for each TRP and all transmission hypotheses.

Furthermore, for Type-2 codebook schemes with frequency compression, the determination of the Part 2 PMI (i.e., the calculation of the coefficient matrix $\tilde{W}_2$) may be based on the calculated common spatial domain basis matrix and the common frequency domain basis matrix, wherein a UE calculates and reports the coefficient matrix $\tilde{W}_2$ for each TRP and each transmission hypothesis. In particular, dependent on the CSI report configuration, a UE may be configured to report a list of per-layer coefficient matrixes for each referred transmission hypothesis that is configured in the CSI report configuration. Of note here, it is not necessary to differentiate between wideband and subband for Type-2 codebook with frequency compression.

As an example of the calculation of the coefficient matrix $\tilde{W}_2$ a UE reports a list of matrixes $\tilde{W}_2^{(TRP\ 1)(hypothesis\ 1)(layer\ j)}$, where j is in the range of $1 \leq j \leq N_{layer}$, for TRP 1 and transmission hypothesis 1. The resultant matrix is quantized so that the payload is reduced.

In some other examples for reducing the CSI payload, the coefficient matrixes of two transmission hypotheses for one TRP having some relationship, similarity, equivalency, or commonality may be utilized to reduce payload by either only reporting one or placing shared matrix columns or rows in a same matrix. For example if $\tilde{W}_2^{(TRP\ 1)(hypothesis\ 1)(layer\ 1)} = \tilde{W}_2^{(TRP\ 1)(hypothesis\ 2)(layer\ 1)}$, then only one coefficient matrix need be reported. In another example, the coefficient matrix $\tilde{W}_2^{(TRP\ 1)(hypothesis\ 2)(layer\ 1)}$ may be composed of a plurality of columns of $\tilde{W}_2^{(TRP\ 1)(hypothesis\ 1)(layer\ 1)}$, or $\tilde{W}_2^{(TRP\ 1)(hypothesis\ 2)(layer\ 1)}$ may be composed of a plurality of rows of $\tilde{W}_2^{(TRP\ 1)(hypothesis\ 1)(layer\ 1)}$, or $\tilde{W}_2^{(TRP\ 1)(hypothesis\ 2)(layer\ 1)}$ may be composed of both a plurality of columns and a plurality of rows of $\tilde{W}_2^{(TRP\ 1)(hypothesis\ 1)(layer\ 1)}$.

Figure 10:
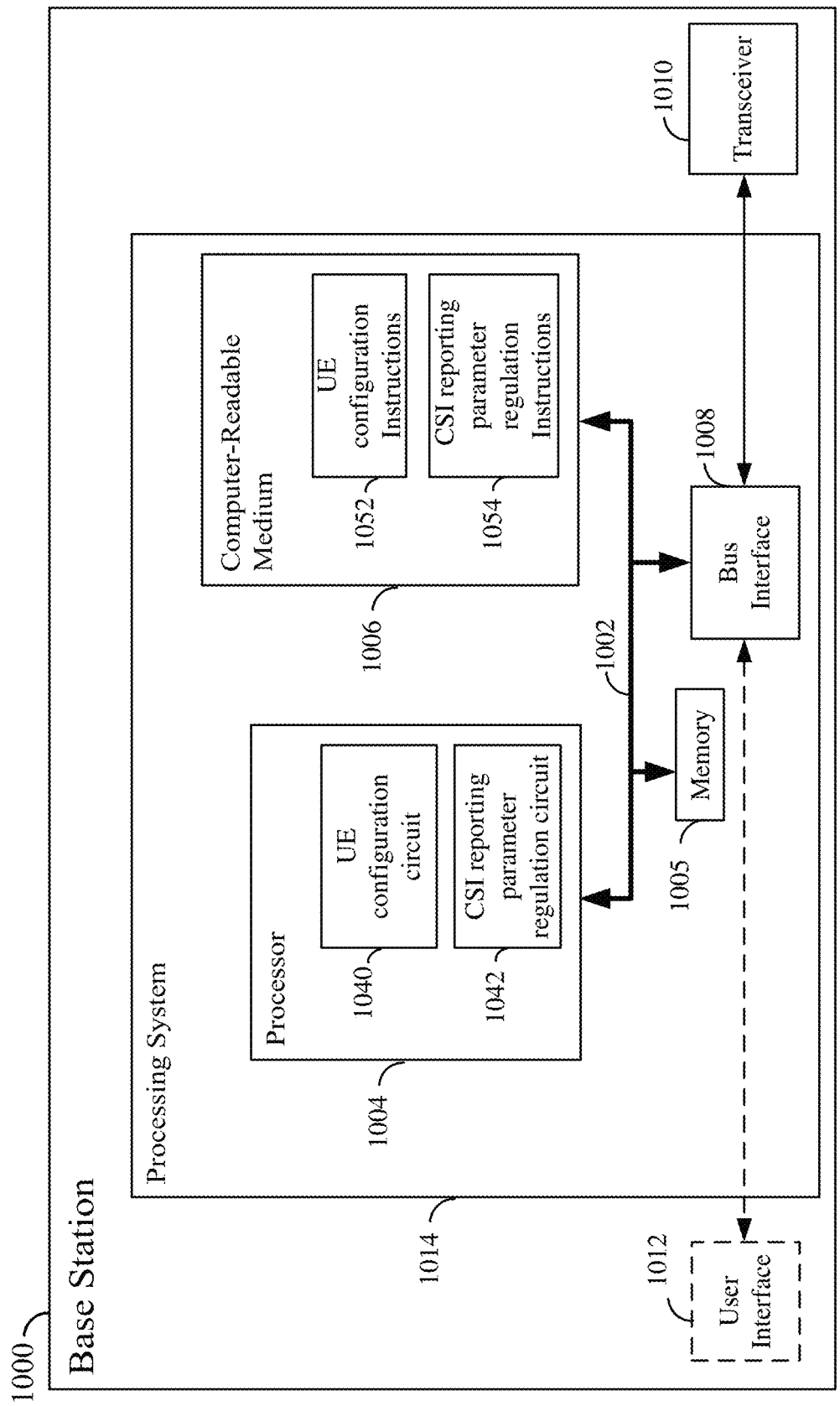
FIG. 10 is a block diagram conceptually illustrating an example of a hardware implementation for a base station according to some aspects of the disclosure.

FIG. 10 is a block diagram illustrating an example of a hardware implementation for a base station 1000 employing a processing system 1014. For example, the base station 1000 may be a gNB or a TRP as illustrated in any one or more of FIGS. 1, 2, 3, and/or 4. In other aspects, the base station 1000 may represent an amalgamation or composite of two or more TRPs and shown simply as one implemented gNB for sake of convenience.

The base station 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1000 may be configured to perform any one or more of the functions described herein. That is, the processor 1004, as utilized in a base station 1000, may be used to implement any one or more of the processes and procedures described below and illustrated in FIG. 13.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. Depending upon the nature of the apparatus, a user interface 1012 (e.g., keypad, touch screen, display, speaker, microphone, joystick) may also be provided. Of course, such a user interface 1012 is optional, and may be omitted in some examples, such as in the present case of a base station 1000.

In some aspects of the disclosure, the processor 1004 may include UE configuration circuitry 1040 that is configured for various functions, including, for example, configuring a UE for CSI reporting in accordance with the methodologies disclosed herein. For example, the UE configuration circuitry 1040 may be configured to implement one or more of the functions described below in relation to FIG. 13, including, e.g., block 1302. Additionally, the UE configuration circuitry 1040 may configure a UE to report for a Type-2 codebook based PMI feed for a number of multi-TRP hypotheses as was discussed earlier, and further for either frequency compression or non-frequency compression codebooks. In still further aspects, the UE configuration circuitry 1040 may interface with radio resource control (RRC) layers and cause the CSI configuration to be communicated via RRC messaging to the UE.

In some other aspects of the disclosure, the processor 1004 may also include CSI reporting parameter regulation circuitry 1042 that is configured for various functions, including, for example, regulating one or more parameters for CSI reporting in accordance with the methodologies disclosed herein. In particular, circuitry 1042 may be configured to limit the CSI payload size by setting parameters affecting the various sizes of the PMI matrixes, such as the parameters $L_{individual}$, $L_{all}$, $L_{max,individual}$, $L_{max,all}$, $L'_{individual}$, $L'_{all}$, $L'_{max,individual}$, and $L'_{max,all}$, discussed before.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1006 may include UE configuration instructions or software 1052 configured for various functions, including, for example, affording the gNB to configure a UE for CSI reporting in accordance with the various methods disclosed herein. For example, the instructions or software 1052 may be configured to implement one or more of the functions described below in relation to FIG. 13, including, e.g., block 1302. Additionally, the UE configuration instructions or software 1052, when executed by processor 1004, for example, may configure a UE to report for a Type-2 codebook based PMI feed for a number of multi-TRP hypotheses as was discussed earlier, and further for either frequency compression or non-frequency compression codebooks. In still further aspects, the UE configuration circuitry 1040 may interface with radio resource control (RRC) layers and cause the CSI configuration to be communicated via RRC messaging to the UE.

In one or more examples, the computer-readable storage medium 1006 may further include CSI reporting parameter regulation instructions or software 1054 configured for various functions, including, regulating one or more parameters for CSI reporting in accordance with the methodologies disclosed herein. In particular, instructions or software 1052, when executed by a processor such as processor 1004, may be configured to limit the CSI payload size by setting parameters affecting the various sizes of the PMI matrixes, such as the parameters $L_{individual}$, $L_{all}$, $L_{max,individual}$, $L_{max,all}$, $L'_{individual}$, $L'_{all}$, $L'_{max,individual}$, and $L'_{max,all}$, discussed earlier.

Figure 11:
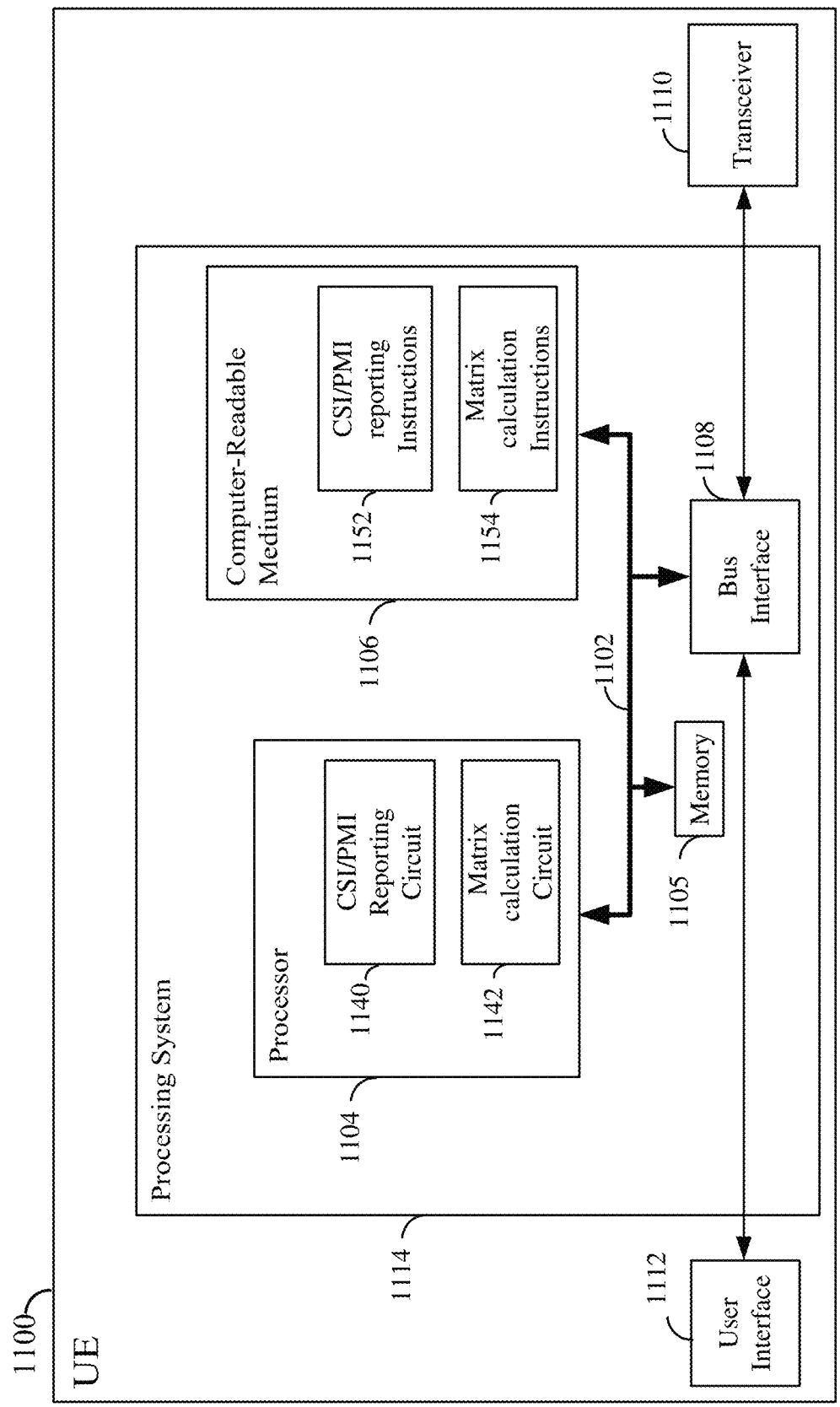
FIG. 11 is a block diagram conceptually illustrating an example of a hardware implementation for a user equipment (UE) according to some aspects of the disclosure.

FIG. 11 is a conceptual diagram illustrating an example of a hardware implementation for an exemplary UE 1100 employing a processing system 1114. In accordance with various aspects of the disclosure, an element, or any portion of an element, or any combination of elements may be implemented with a processing system 1114 that includes one or more processors 1104. For example, the UE 110 may be a user equipment (UE) as illustrated in any one or more of FIGS. 1, 2, 3, and/or 4.

The processing system 1114 may be substantially the same as the processing system 1014 illustrated in FIG. 10, including a bus interface 1108, a bus 1102, memory 1105, a processor 1104, and a computer-readable medium 1106. Furthermore, the UE 1100 may include a user interface 1112 and a transceiver 1110 substantially similar to those described above in connection with FIG. 10. That is, the processor 1104, as utilized in a UE 1100, may be used to implement any one or more of the processes described below and illustrated in FIG. 12.

In some aspects of the disclosure, the processor 1104 may include CSI/PMI reporting circuitry 1140 configured for various functions, including, for example, determining the PMI parts for reporting/transmission to the gNB (e.g., base station 1000 in FIG. 10), and determining the particular CSI reporting based on whether the codebook being used in a Type-2 codebook with or without frequency compression. Additionally, the CSI/PMI reporting circuit 1140 may include measuring the DL channels from two or more TRPs in a multi-TRP system, wherein the measurements are used to determine/calculate the various spatial domain basis, frequency domain basis, and coefficient matrixes. For example, the CSI/PMI reporting circuitry 1140 may be configured to implement one or more of the functions described below in relation to FIG. 12, including, e.g., block 1202 or 1206.

In some other aspects of the disclosure, the processor 1104 may include matrix calculation circuitry 1142 configured for various functions, including, for example, determining and/or calculating the various matrixes that are reported in the CSI, including Part 1 and Part 2 information as discussed earlier. Additionally, the matrix calculation circuit may account for the various parameter regulations determined by the network, such those set by circuitry 1042 or instructions 1054 as discussed above. Additionally, the CSI/PMI reporting circuit 1140 may assist in determining or calculating the various spatial domain basis, frequency domain basis, and coefficient matrixes.

In one or more examples, the computer-readable storage medium 1106 may include CSI/PMI reporting instructions or software 1152 configured for various functions, including, for example, determining the PMI parts for reporting/transmission to the gNB (e.g., base station 1000 in FIG. 10), and determining the particular CSI reporting based on whether the codebook being used in a Type-2 codebook with or without frequency compression. Additionally, the CSI/PMI reporting circuit 1140 may include measuring the DL channels from two or more TRPs in a multi-TRP system, wherein the measurements are used to determine/calculate the various spatial domain basis, frequency domain basis, and coefficient matrixes. For example, the CSI/PMI reporting circuitry 1140 may be configured to implement one or more of the functions described below in relation to FIG. 12, including, e.g., block 1202 or 1206.

In one or more examples, the computer-readable storage medium 1006 may further include matrix calculation instructions or software 1154 configured for various functions, including, determining and/or calculating the various matrixes that are reported in the CSI, including Part 1 and Part 2 information as discussed earlier. Additionally, the matrix calculation circuit may account for the various parameter regulations determined by the network, such those set by circuitry 1042 or instructions 1054 as discussed above.

Figure 12:
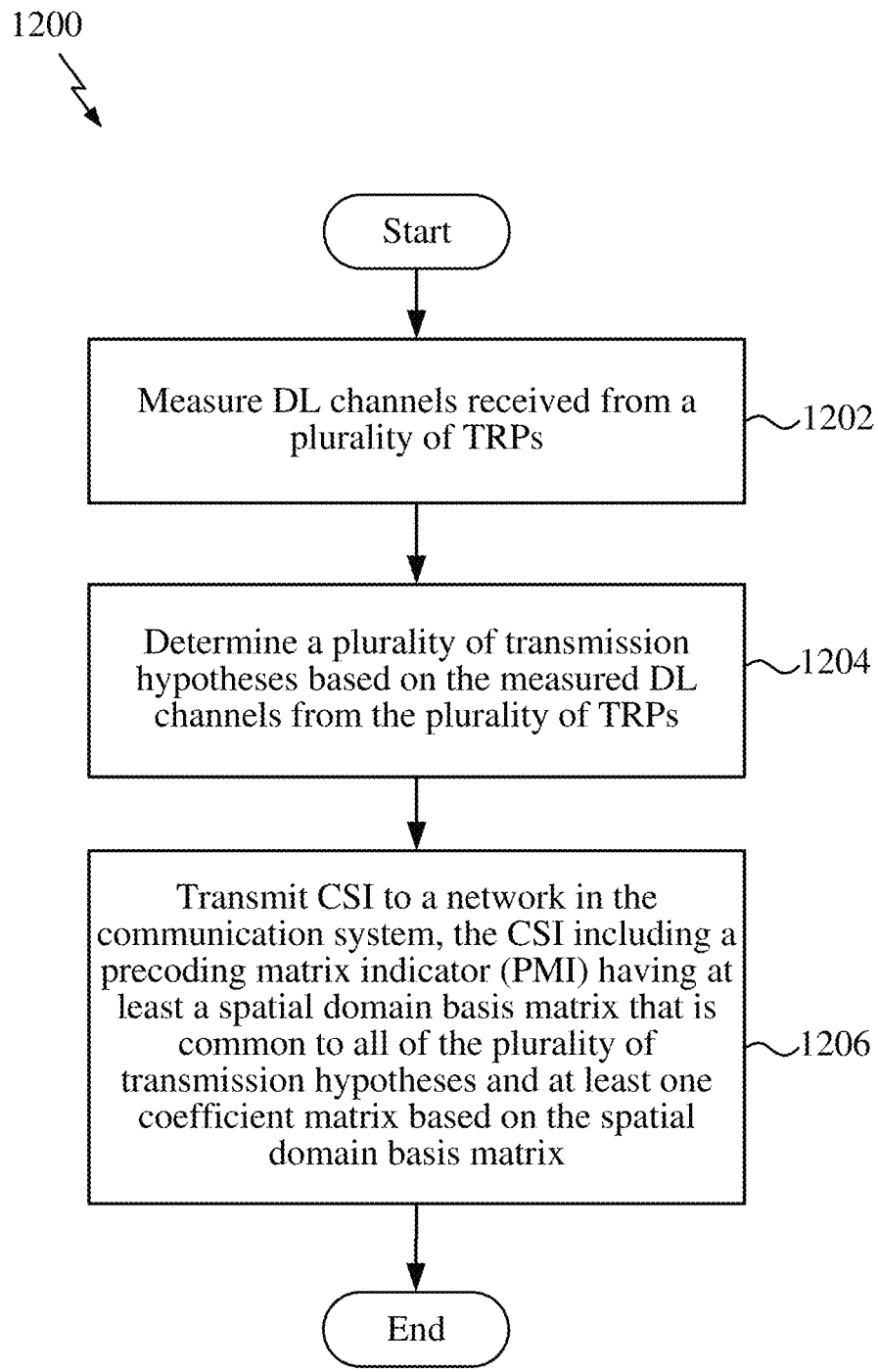
FIG. 12 is a flow chart illustrating an exemplary method for CSI reporting in a UE according to some aspects of the disclosure.

FIG. 12 is a flow chart illustrating an exemplary method 1200 for reporting CSI in a UE for a plurality of TRPs in accordance with some aspects of the present disclosure. As described below, some or all illustrated features may be omitted in a particular implementation within the scope of the present disclosure, and some illustrated features may not be required for implementation of all embodiments. In some examples, the method 1200 may be carried out by the UE 1100 illustrated in FIG. 11. In some examples, the method 1200 may be carried out by any suitable apparatus or means for carrying out the functions or algorithm described below.

At block 1202, method 1200 includes measuring downlink (DL) channels received from a plurality of TRPs. After measurement in block 1202, method 1200 includes determining a plurality of transmission hypotheses based on the measured DL channels from the plurality of TRPs as shown at block 1204.

Next, method 1200 includes transmitting a CSI to a network in the communication system, where the CSI includes a precoding matrix indicator (PMI) having at least a spatial domain basis matrix that is common to all of the plurality of transmission hypotheses and at least once coefficient matrix based on the spatial domain basis matrix as shown in block 1206. It is noted that the processes of method 1200 may be utilized for both Type-2 codebooks, whether the codebook is using frequency compression or not.

Figure 9:
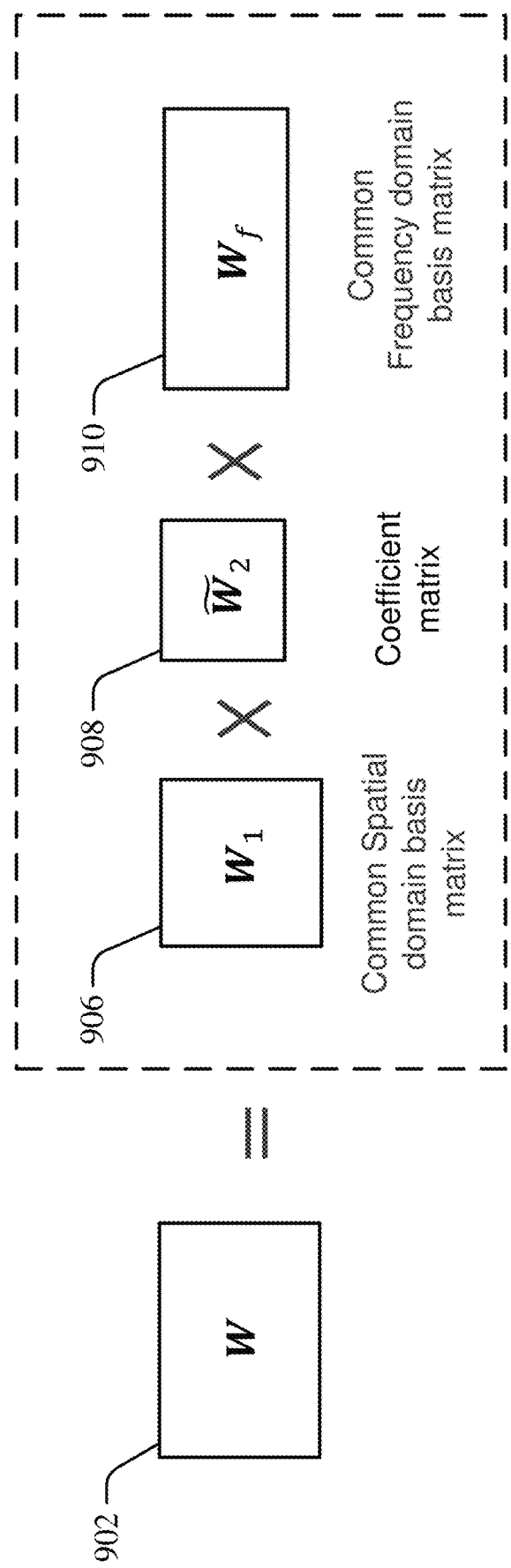
FIG. 9 is an illustration of the composition of an exemplary precoding matrix with frequency compression according to some aspects of the disclosure.

According to further aspects, the PMI of method 1200 may further include at least one of a wideband or a list of per subband coefficient matrixes for each respective transmission hypothesis of the plurality of hypotheses. Further, the PMI may include at least one frequency domain basis matrix that is common to all of the plurality of transmission hypotheses as was discussed earlier with respect to FIG. 9.

According to further aspects, it is noted that method 1200 may include receiving one or more further transmission hypotheses concerning the TRPs from one or more of the TRPs (or gNB) in the communication system. Thus, the UE may receive the one or more further transmission hypotheses concerning the TRPs from one or more of the plurality of TRPs. In turn, the UE may then determine the plurality of transmission hypotheses based, in part, on the one or more further transmission hypotheses received from at least one TRP (or gNB).

Moreover, method 1200 may further include matching the common spatial-domain basis matrix with a plurality of coefficient matrixes corresponding to all transmission hypotheses. In a particular aspect, matching may include matching the common spatial domain basis matrix and the common frequency domain basis matrix with the plurality of coefficient matrixes corresponding to all transmission hypotheses including the common spatial domain basis matrix and the common frequency domain basis matrix respectively comprising a list of spatial domain basis matrixes and a list of frequency domain basis matrixes corresponding to the plurality of TRPs.

In yet further aspects, method 1200 may include restricting the size of the spatial domain basis matrix based on CSI parameter restrictions received from at least one gNB or base station, as was discussed earlier. The CSI parameter restrictions may include one or more of: (1) limiting a number of columns in the spatial domain basis matrix to a set number; (2) limiting the number of columns in the spatial domain basis matrix to be equal to or less than a maximum number; (3) limiting a sum of the columns in the spatial domain basis matrix to a set value; and (4) limiting the sum of columns in the spatial domain basis matrix to be equal to or less than a maximum value.

Also, method 1200 may include restricting the size of the at least one frequency domain basis matrix based on CSI parameter restrictions received from at least one gNB or base station. These CSI parameter restrictions may include at least one of: (1) limiting a number of columns in the at least one frequency domain basis matrix to a set number; (2) limiting the number of columns in the at least one frequency domain basis matrix to be equal to or less than a maximum number; (3) limiting a sum of the columns in the at least one frequency domain basis matrix to a set value; and (4) limiting the sum of columns in the at least one frequency domain basis matrix to be equal to or less than a maximum value.

In yet further aspects, method 1200 may include determining if two or more transmission hypotheses for one TRP have a commonality between respective coefficient matrixes, and reducing a size of the CSI when determining that the two or more transmission hypotheses for one TRP have a commonality between respective coefficient matrixes.

Figure 13:
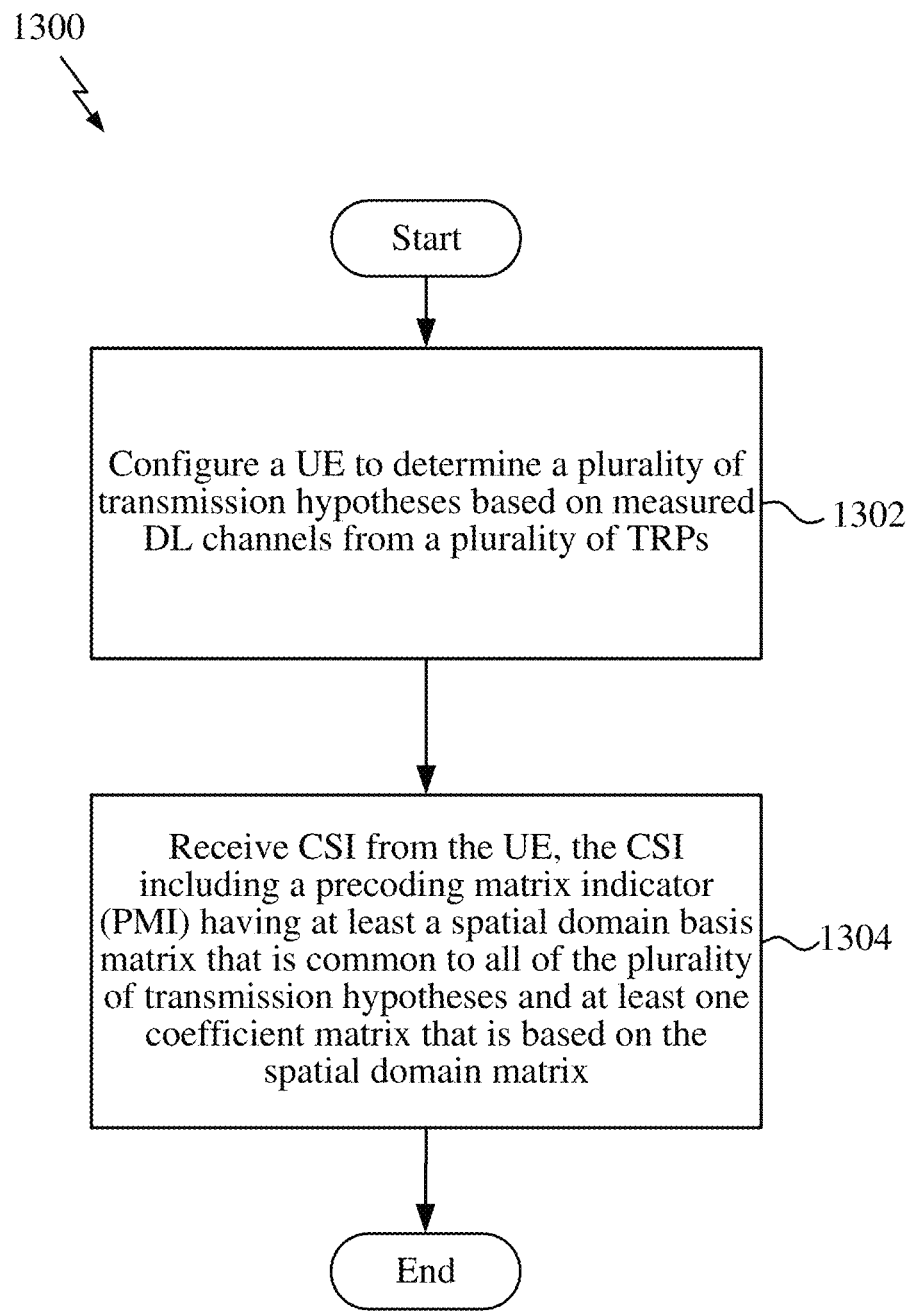
FIG. 13 is a flow chart illustrating an exemplary method for CSI reporting as directed by a base station according to some aspects of the disclosure.

FIG. 13 is a flow chart illustrating an exemplary method 1300 for configuring CSI in a UE in a communication system having a plurality of TRPs in accordance with some aspects of the present disclosure. As described below, some or all illustrated features may be omitted in a particular implementation within the scope of the present disclosure, and some illustrated features may not be required for implementation of all embodiments. In some examples, the method 1300 may be carried out by the base station 1000 illustrated in FIG. 10. In some examples, the method 1200 may be carried out by any suitable apparatus or means for carrying out the functions or algorithm described below.

At block 1302, method 1300 includes configuring a UE to determine a plurality of transmission hypotheses based on the measured DL channels from a plurality of TRPs. This CSI configuration may further include setting restrictions on the size of the various matrixes as was discussed earlier.

Further, method 1300 includes receiving the CSI from the UE, the CSI including a precoding matrix indicator (PMI) having at least a spatial domain basis matrix that is common to all of the plurality of transmission hypotheses and at least one coefficient matrix that is based on the spatial domain matrix as shown in block 1304.

In one configuration, the apparatus 1000 or 1100 for wireless communication includes means for measuring downlink (DL) channels received in a user equipment (UE) from a plurality of transmission and reception points (TRPs) in a communication system, means for determining a plurality of transmission hypotheses based on the measured DL channels from the plurality of TRPs; and means for transmitting channel state information (CSI) to a network in the communication system, the CSI including a precoding matrix indicator (PMI) having at least a spatial domain basis matrix that is common to all of the plurality of transmission hypotheses and at least one coefficient matrix that is based on the spatial domain basis matrix. In one aspect, the aforementioned means may be the processor(s) 1004 or 1104 shown in FIGS. 10 and 11 configured to perform the functions recited by the aforementioned means. In another aspect, the aforementioned means may be a circuit or any apparatus configured to perform the functions recited by the aforementioned means.

Of course, in the above examples, the circuitry included in the processors 1004 or 1104 is merely provided as an example, and other means for carrying out the described functions may be included within various aspects of the present disclosure, including but not limited to the instructions stored in the computer-readable storage medium 1006 or 1106, or any other suitable apparatus or means described in any one of the FIGS. 1, 2, 3, and/or 4, and utilizing, for example, the processes and/or algorithms described herein in relation to FIGS. 12 and/or 13.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-4, 10, and 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for a user equipment (UE) to report channel state information (CSI) for a plurality of transmission and reception points (TRPs) in a communication system, the method comprising:
   measuring downlink (DL) channels received from a plurality of TRPs;
   determining a plurality of transmission hypotheses based on the measured DL channels from the plurality of TRPs; and
   transmitting channel state information (CSI) to a network in the communication system, the CSI including a plurality of precoding matrix indicators (PMIs) and having one common spatial domain basis matrix that is common to all of the plurality of transmission hypotheses and a plurality of coefficient matrices that are based on the common spatial domain basis matrix.

2. The method of claim 1, wherein determining the plurality of transmission hypotheses further comprises:
   receiving from at least one TRP of the plurality of TRPs one or more further transmission hypotheses; and
   determining the plurality of transmission hypotheses based, in part, on the one or more further transmission hypotheses.

3. The method of claim 1, wherein the CSI further comprises at least one of a wideband or a list of per subband coefficient matrices for each respective transmission hypothesis of the plurality of hypotheses.

4. The method of claim 1, wherein the CSI further comprises at least one common frequency domain basis matrix that is common to all of the plurality of transmission hypotheses.

5. The method of claim 4, wherein the CSI further comprises a list of per layer coefficient matrices for each respective transmission hypothesis of the plurality of hypotheses.

6. The method of claim 1, further comprising:
   matching the one common spatial domain basis matrix with a plurality of coefficient matrices corresponding to all transmission hypotheses.

7. The method of claim 6, wherein matching the one common spatial domain basis matrix with the plurality of coefficient matrices corresponding to all transmission hypotheses includes the one common spatial domain basis matrix comprising a list of spatial domain basis matrices corresponding to the plurality of TRPs.

8. The method of claim 4, further comprising:
   matching the one common spatial domain basis matrix and the at least one common frequency domain basis matrix with a plurality of coefficient matrices corresponding to all transmission hypotheses.

9. The method of claim 8, wherein matching the one common spatial domain basis matrix and the at least one common frequency domain basis matrix with the plurality of coefficient matrices corresponding to all transmission hypotheses includes the one common spatial domain basis matrix and the at least one common frequency domain basis matrix respectively comprising a list of spatial-domain basis matrices and a list of frequency-domain basis matrices corresponding to the plurality of TRPs.

10. The method of claim 1, wherein the size of the one common spatial domain basis matrix is restricted based on CSI parameter restrictions received from at least one gNB.

11. The method of claim 10, wherein the CSI parameter restrictions include at least one of:
    (1) limiting a number of columns in the one common spatial domain basis matrix to a set number;
    (2) limiting the number of columns in the one common spatial domain basis matrix to be equal to or less than a maximum number;
    (3) limiting a sum of the columns in the one common spatial domain basis matrix to a set value; and
    (4) limiting the sum of columns in the one common spatial domain basis matrix to be equal to or less than a maximum value.

12. The method of claim 4, wherein the size of the at least one common frequency domain basis matrix is restricted based on CSI parameter restrictions received from at least one gNB.

13. The method of claim 12, wherein the CSI parameter restrictions include at least one of:
    (1) limiting a number of columns in the at least one common frequency domain basis matrix to a set number;
    (2) limiting the number of columns in the at least one common frequency domain basis matrix to be equal to or less than a maximum number;
    (3) limiting a sum of the columns in the at least one common frequency domain basis matrix to a set value; and
    (4) limiting the sum of columns in the at least one common frequency domain basis matrix to be equal to or less than a maximum value.

14. The method of claim 1, wherein a product of the one common spatial domain basis matrix and a coefficient matrix constitutes a DL precoding matrix.

15. The method of claim 1, wherein a product of the one common spatial domain basis matrix, a coefficient matrix and a frequency domain basis matrix constitutes a DL precoding matrix.

16. The method of claim 1, further comprising:
determining if two or more transmission hypotheses for one TRP have a commonality between respective coefficient matrices; and
reducing a size of the CSI when determining that the two or more transmission hypotheses for one TRP have a commonality between respective coefficient matrices.

17. An apparatus for wireless communication, comprising:
means for measuring downlink (DL) channels received in a user equipment (UE) from a plurality of transmission and reception points (TRPs) in a communication system;
means for determining a plurality of transmission hypotheses based on the measured DL channels from the plurality of TRPs; and
means for transmitting channel state information (CSI) to a network in the communication system, the CSI including a plurality of precoding matrix indicators (PMIs) and having one common spatial domain basis matrix that is common to all of the plurality of transmission hypotheses and a plurality of coefficient matrix that is matrices that are based on the common spatial domain basis matrix.

18. A non-transitory computer-readable medium storing computer-executable code, comprising code for causing a computer to:
measure downlink (DL) channels received in a user equipment (UE) from a plurality of transmission and reception points (TRPs) in a communication system;
determine a plurality of transmission hypotheses based on the measured DL channels from the plurality of TRPs; and
transmit channel state information (CSI) to a network in the communication system, the CSI including a plurality of precoding matrix indicators (PMIs) and having one common spatial domain basis matrix that is common to all of the plurality of transmission hypotheses and a plurality of coefficient matrices that are based on the common spatial domain basis matrix.

19. An apparatus for wireless communication, comprising:
one or more processors; and
one or more memories coupled to the one or more processors,
wherein the one or more processors are configured to:
measure downlink (DL) channels received from a plurality of transmission and reception points (TRPs) in a communication system;
determine a plurality of transmission hypotheses based on the measured DL channels from the plurality of TRPs; and
transmit channel state information (CSI) to a network in the communication system, the CSI including a plurality of precoding matrix indicators (PMIs) and having one common spatial domain basis matrix that is common to all of the plurality of transmission hypotheses and a plurality of coefficient matrices that are based on the common spatial domain basis matrix.

20. A method for a radio access network (RAN) entity to configure channel state information (CSI) reporting in a multiple transmission and reception point (TRP) communication system, the method comprising:
configuring a user equipment (UE) to determine a plurality of transmission hypotheses based on measured downlink (DL) channels from a plurality of TRPs; and
receiving CSI from the UE, the CSI including a plurality of precoding matrix indicators (PMIs) and having one common spatial domain basis matrix that is common to all of the plurality of transmission hypotheses and a plurality of coefficient matrices that are based on the common spatial domain basis matrix.

21. The method of claim 20, wherein configuring the UE to determine the plurality of transmission hypotheses further comprises:
transmitting one or more further transmission hypotheses concerning the plurality of TRPs to the UE; and
configuring the UE to determine the plurality of transmission hypotheses based, in part, on the one or more further transmission hypotheses.

22. The method of claim 20, wherein the CSI further comprises at least one of a wideband or a list of per subband coefficient matrices for each respective transmission hypothesis of the plurality of hypotheses.

23. The method of claim 20, wherein the CSI further comprises at least one common frequency domain basis matrix that is common to all of the plurality of transmission hypotheses.

24. The method of claim 20, wherein the CSI further comprises a list of per layer coefficient matrices for each respective transmission hypothesis of the plurality of hypotheses.

25. The method of claim 20, wherein the one common spatial domain basis matrix is matched with a plurality of coefficient matrices corresponding to all transmission hypotheses.

26. The method of claim 25, wherein matching the one common spatial domain basis matrix with the plurality of coefficient matrices corresponding to all transmission hypotheses includes common spatial domain basis matrix comprising a list of matrices corresponding to the plurality of TRPs.

27. The method of claim 23, further comprising:
matching the one common spatial domain basis matrix and the at least one common frequency domain basis matrix with a plurality of coefficient matrices corresponding to all transmission hypotheses.

28. The method of claim 27, wherein matching the one common spatial domain basis matrix and the at least one common frequency domain basis matrix with the plurality of coefficient matrices corresponding to all transmission hypotheses includes the one common spatial domain basis matrix and the at least one common frequency domain basis matrix respectively comprising a list of spatial-domain basis matrices and a list of frequency-domain basis matrices corresponding to the plurality of TRPs.

29. The method of claim 20, further comprising:
determining CSI parameter restrictions that restrict the size of the one common spatial domain basis matrix; and
transmitting the CSI parameter restrictions to the UE.

30. The method of claim 29, wherein the CSI parameter restrictions include at least one of:
(1) limiting a number of columns in the one common spatial domain basis matrix to a set number;

(2) limiting the number of columns in the one common spatial domain basis matrix to be equal to or less than a maximum number;
(3) limiting a sum of the columns in the one common spatial domain basis matrix to a set value; and
(4) limiting the sum of columns in the one common spatial domain basis matrix to be equal to or less than a maximum value.

31. The method of claim 23, further comprising:
determining CSI parameter restrictions that restrict the size of the at least one common frequency domain basis matrix; and
transmitting the CSI parameter restrictions to the UE.

32. The method of claim 31, wherein the CSI parameter restrictions include at least one of:
(1) limiting a number of columns in the at least one common frequency domain basis matrix to a set number;
(2) limiting the number of columns in the at least one common frequency domain basis matrix to be equal to or less than a maximum number;
(3) limiting a sum of the columns in the at least one common frequency domain basis matrix to a set value; and
(4) limiting the sum of the columns in the at least one common frequency domain basis matrix to be equal to or less than a maximum value.

33. The method of claim 20, wherein a product of the one common spatial domain basis matrix and a coefficient matrix constitutes a DL precoding matrix.

34. The method of claim 20, wherein a product of the one common spatial domain basis matrix, a coefficient matrix and a frequency domain basis matrix constitutes a DL precoding matrix.

35. The method of claim 20, further comprising:
determining if two or more transmission hypotheses for one TRP have a commonality between respective coefficient matrices; and
reducing a size of the CSI when determining that the two or more transmission hypotheses for one TRP have a commonality between respective coefficient matrices.

36. An apparatus for wireless communication, comprising:
means for configuring a user equipment (UE) to determine a plurality of transmission hypotheses based on measured downlink (DL) channels from a plurality of TRPs; and
means for receiving channel state information (CSI) from the UE, the CSI including a plurality of precoding matrix indicators (PMIs) and having one common spatial domain basis matrix that is common to all of the plurality of transmission hypotheses and a plurality of coefficient matrices that are based on the common spatial domain basis matrix.

37. A non-transitory computer-readable medium storing computer-executable code, comprising code for causing a computer to:
configure a user equipment (UE) to determine a plurality of transmission hypotheses based on measured downlink (DL) channels from a plurality of TRPs;
receive channel state information (CSI) from the UE, the CSI including a plurality of precoding matrix indicators (PMIs) and having one common spatial domain basis matrix that is common to all of the plurality of transmission hypotheses and a plurality of coefficient matrices that are based on the common spatial domain basis matrix.

38. An apparatus for wireless communication, comprising:
one or more processors; and
one or more memories coupled to the one or more processors,
wherein the one or more processors are configured to:
configure a user equipment (UE) to determine a plurality of transmission hypotheses based on measured downlink (DL) channels from a plurality of TRPs; and
receive channel state information (CSI) from the UE, the CSI including a plurality of precoding matrix indicators (PMIs) and having one common spatial domain basis matrix that is common to all of the plurality of transmission hypotheses and a plurality of coefficient matrices that are based on the common spatial domain basis matrix.

39. The method of claim 1, further comprising calculating the one common spatial domain basis matrix that is common to all of the plurality of transmission hypotheses; and wherein determining a plurality of transmission hypotheses further comprises calculating the least one coefficient matrix based on the common spatial domain basis matrix.

40. The method of claim 20, further comprising configuring the UE to calculate the one common spatial domain basis matrix and to calculate the at least one coefficient matrix based on the common spatial domain basis matrix.

* * * * *